US006902776B2

(12) United States Patent
Junge

(10) Patent No.: US 6,902,776 B2
(45) Date of Patent: Jun. 7, 2005

(54) ENERGY-SAVING LIQUID-CRYSTAL MIXTURES

(75) Inventor: Michael Junge, Pfungstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/677,323

(22) Filed: Oct. 3, 2003

(65) Prior Publication Data

US 2004/0094747 A1 May 20, 2004

(30) Foreign Application Priority Data

Oct. 4, 2002 (DE) .......................................... 102 46 358

(51) Int. Cl.⁷ ........................ C09K 19/30; C09K 19/34; C09K 19/12; C09K 19/20
(52) U.S. Cl. .............. 428/1.1; 252/299.61; 252/299.63; 252/299.66; 252/299.67
(58) Field of Search ....................... 428/1.1; 252/299.61, 252/299.63, 299.66, 299.67, 299.01

(56) References Cited

U.S. PATENT DOCUMENTS

| | | | | |
|---|---|---|---|---|
| 6,017,469 A | * | 1/2000 | Reiffenrath et al. .... | 252/299.63 |
| 6,531,194 B2 | * | 3/2003 | Hirschmann ................ | 428/1.1 |
| 6,544,602 B1 | * | 4/2003 | Hirschmann et al. ........ | 428/1.1 |
| 6,613,401 B2 | * | 9/2003 | Hirschmann et al. ........ | 428/1.1 |
| 6,649,229 B2 | * | 11/2003 | Hirschmann ................ | 428/1.1 |

* cited by examiner

Primary Examiner—Shean C. Wu
(74) Attorney, Agent, or Firm—Millen, White, Zelano & Branigan, P.C.

(57) ABSTRACT

The invention relates to energy-saving liquid-crystalline media, in particular in twisted nematic (TN) and supertwisted nematic (STN) liquid-crystal displays, having very short response times and good steepnesses and angle dependences, and to electro-optical display devices containing these media and to the use of these media in electro-optical display devices, where the media comprise:

a component (α) which comprises at least one compound of the formula I

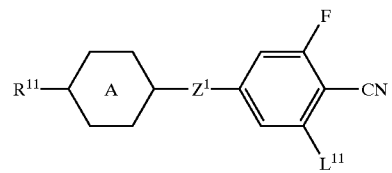

and a component (β) which comprises at least one compound of the formula II

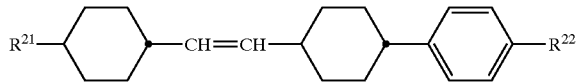

where the following applies for the dielectric anisotropy $\Delta\varepsilon_{corr}$ of the liquid-crystalline medium:

$$\Delta\varepsilon_{corr} \leq \frac{5 \cdot V_{10} + 32}{V_{10}^2}. \quad (1)$$

22 Claims, No Drawings

ENERGY-SAVING LIQUID-CRYSTAL MIXTURES

The invention relates to energy-saving liquid-crystalline media, in particular in twisted nematic (TN) and supertwisted nematic (STN) liquid-crystal displays, having very short response times and good steepnesses and angle dependences, and to electro-optical display devices containing these media and to the use of these media in electro-optical display devices.

TN displays are known, for example from M. Schadt and W. Helfrich, Appl. Phys. Lett., 18, 127 (1971). STN displays are known, for example from EP 0 131 216 B1; DE 34 23 993 A1; EP 0 098 070 A2; M. Schadt and F. Leenhouts, 17. Freiburger Arbeitstagung Flüssigkristalle (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements described by Waters et al. (C. M. Waters et al., Proc. Soc. Inf. Disp. (New York) (1985) (3rd Intern. Display Conference, Kobe, Japan), STN-LCD's (DE-A 35 03 259), SBE-LCD's (T. J. Scheffer and J. Nehring, Appl. Phys. Lett. 45 (1984) 1021), OMI-LCD's (M. Schadt and F. Leenhouts, Appl. Phys. Lett. 50 (1987), 236, DST-LCD's (EP-A 0 246 842) or BW-STN-LCD's (K. Kawasaki et al., SID 87 Digest 391 (20.6)).

STN displays in particular are distinguished, compared with standard TN displays, by significantly better steepnesses of the electro-optical characteristic line and consequently better contrast values and by significantly lower angle dependence of the contrast.

Of particular interest are TN and STN displays having very short response times, in particular also at relatively low temperatures. In order to achieve short response times, the rotational viscosities γ1 of the liquid-crystal mixtures have hitherto been optimized using mostly monotropic additives having a relatively high vapor pressure. However, the response times achieved were not adequate for all applications.

In order to achieve a steep electro-optical characteristic line in the displays according to the invention, the liquid-crystal mixtures should have relatively large values for the ratio of the elastic constants K33/K11 and relatively small values for $\Delta\epsilon/\epsilon\perp$, where $\Delta\epsilon$ is the dielectric anisotropy and $\epsilon\perp$ is the dielectric constant perpendicular to the longitudinal molecular axis.

In addition to optimization of the contrast and response times, further important requirements are made of mixtures of this type:

1. broad d/p window
2. high long-term chemical stability
3. high electrical resistance
4. low frequency and temperature dependence of the threshold voltage.

There thus continues to be a great demand for liquid-crystalline mixtures, in particular for TN and STN displays, having very short response times at the same time as a large working-temperature range, high characteristic line steepness, good angle dependence of the contrast and low threshold voltage which meet the above-mentioned requirements.

Furthermore, more recent electro-optical liquid-crystal display devices, for example displays of high complexity, and novel electronic equipment containing liquid-crystalline media and having diverse and complex functions (for example multifunctional mobile telephones) have significantly increased power consumption. This results in an increase in current consumption in this equipment and, in particular in equipment operated with rechargeable or other batteries, in more rapid discharging, and consequently in shorter operating times. The operating costs thus increase and, in particular, the use comfort of the equipment, which is usually used in a mobile manner, drops.

The present invention therefore has an object of providing liquid-crystalline media whose use in electro-optical display devices results in a reduction in power consumption and which simultaneously do not have the other above-mentioned disadvantages of conventional liquid-crystal mixtures, or do so to a lesser extent, and at the same time have short response times and very good steepnesses.

Upon further study of the specification and appended claims, further objects and advantages of this invention will become apparent to those skilled in the art.

It has now been found that these and other objects are achieved by a liquid-crystalline medium comprising a component (α) which comprises at least one compound of the formula I

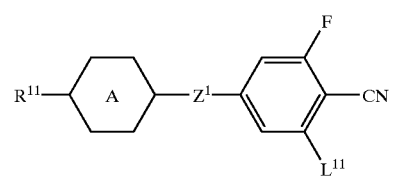

where $L^{11}$ is H or F;

$R^{11}$ is alkyl having from 1 to 12 carbon atoms or alkenyl having from 2 to 12 carbon atoms;

$Z^1$ is a single bond or —COO—; and

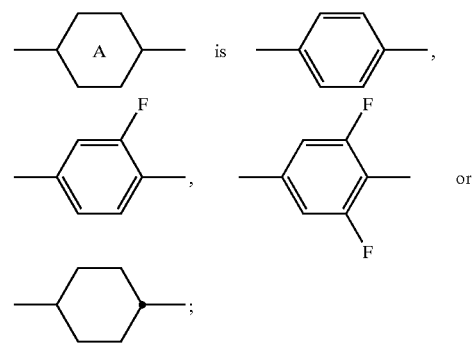

and a component (β) which comprises at least one compound of the formula II

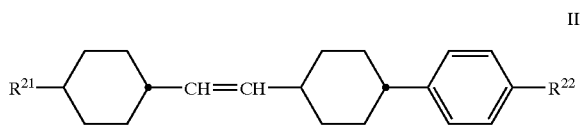

where
R²¹ is alkyl having from 1 to 12 carbon atoms or alkenyl having from 2 to 12 carbon atoms;
R²² is alkyl having from 1 to 12 carbon atoms or alkenyl having from 2 to 12 carbon atoms, in which one —CH₂— group may be replaced by oxygen;
where the following applies for the dielectric anisotropy Δε$_{corr}$ of the liquid-crystalline medium:

$$\Delta \varepsilon_{corr} \leq \frac{5 \cdot V_{10} + 32}{V_{10}^2}. \tag{1}$$

(In equation (1), Δε$_{corr}$ denotes the dielectric anisotropy Δε$_{exp}$ determined experimentally at T$_{exp}$ and corrected in accordance with equation (2) to a clearing point of the liquid-crystalline medium of 373 K (100° C.)

$$\Delta \varepsilon_{corr} = \Delta \varepsilon_{exp} \cdot \frac{\left(1 - \frac{T_{exp}}{373 \, K}\right)^{0.22}}{\left(1 - \frac{T_{exp}}{T_{cl.p.}}\right)^{0.22}} \tag{2}$$

where
T$_{exp}$=293 K (20° C.) and
T$_{cl.p.}$=clearing point in ° K;
and V₁₀ denotes the threshold voltage of the liquid-crystalline medium (having a transmission of 10%) in an STN display having a pretilt angle of 5° and a twist angle of 240° at 293 K and vertical incidence in yellow mode).

The use of the liquid-crystalline medium according to the invention in an electro-optical display device effects not only
high steepness of the electro-optical characteristic line
low temperature dependence of the threshold voltage and
very fast response times, in particular at low temperatures,
but also reduces, in particular, the energy consumption thereof compared with the use of conventional liquid-crystalline media. It has been found that compliance with the condition for dielectric anisotropy indicated in equation (1) is essential here. Without wishing to claim that it is possible to give a comprehensive theoretical explanation for this effect, one reason for this energy-saving effect may possibly be that compliance with the condition indicated in equation (1) causes the dielectric anisotropy of the energy-saving liquid-crystalline medium of the present invention present in an electro-optical display device to drop to such an extent that the total current consumption and thus the power consumption of the electro-optical display device as a whole drops via a reduction in the capacitance of the liquid-crystal display.

The energy-saving liquid-crystalline media according to the invention thus allow—in particular for TN and STN displays—at the same time an improvement in the electro-optical parameters, such as steepness of the characteristic line, temperature dependence of the threshold voltage and response times, and a reduction in the energy consumption by reducing the power consumption of the display containing the liquid-crystalline medium according to the invention.

The energy-saving liquid-crystalline media according to the invention significantly shorten, in particular, the response times of TN and STN mixtures with at the same time an increase in the steepness and low temperature dependence of the threshold voltage and with a reduction in the energy consumption.

The media according to the invention are furthermore distinguished by the following properties:
low viscosity,
low rotational viscosity,
low threshold voltage and operating voltage,
high storage stability in the display at low temperatures.

The energy-saving liquid-crystalline medium according to the invention is used in electro-optical display devices, in particular TN and STN displays. A liquid-crystal display of this type comprises, for example,
two outer plates, which, together with a frame, form a cell,
a nematic liquid-crystal mixture of positive dielectric anisotropy located in the cell,
electrode layers with alignment layers on the insides of the outer plates,
a pretilt angle between the longitudinal axis of the molecules at the surface of the outer plates and the outer plates of from 0 degrees to 30 degrees, and
a twist angle of the liquid-crystal mixture in the cell from alignment layer to alignment layer with a value of between 22.5° and 600°,
and is characterized in that it contains an energy-saving liquid-crystalline medium as described above.

In a particularly preferred embodiment, the medium according to the invention comprises
a nematic liquid-crystal mixture comprising
a) 5–75% by weight of a liquid-crystalline component (α), comprising at least one compound having a dielectric anisotropy of greater than +1.5;
b) 25–85% by weight of a liquid-crystalline component (β), comprising at least one compound having a dielectric anisotropy of between −1.5 and +1.5;
c) 0–20% by weight of a liquid-crystalline component (δ); and
d) optionally an optically active component (χ) in such an amount that the ratio between the layer thickness (separation of the outer plates) and the natural pitch of the chiral nematic liquid-crystal mixture is from about 0.2 to 1.3,
where component (α) comprises at least one compound of the formula I and component (β) comprises at least one compound of the formula II, and the following applies for the dielectric anisotropy Δε$_{corr}$ of the mixture:

$$\Delta \varepsilon_{corr} \leq \frac{5 \cdot V_{10} + 32}{V_{10}^2}. \tag{1}$$

The invention also relates to corresponding liquid-crystal mixtures for use in TN and STN displays, in particular in medium- and low-multiplexed STN displays.

The formula I covers, for example, compounds of the formulae I1 to I18:
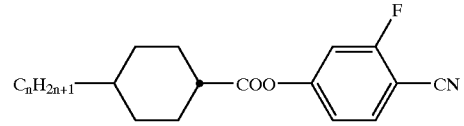
I1
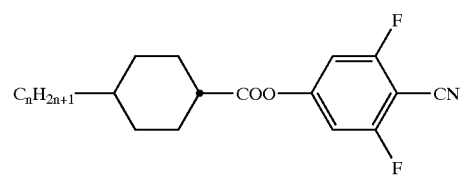
I2
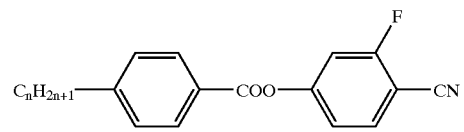
I3
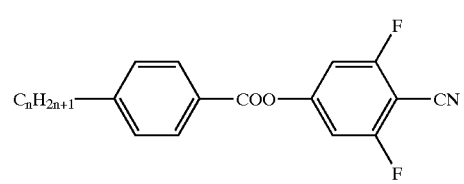
I4
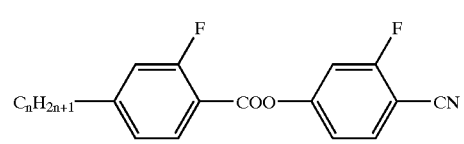
I5
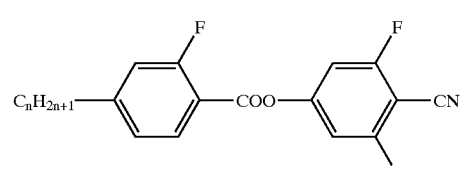
I6
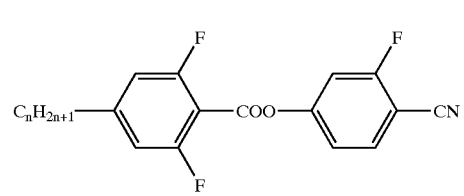
I7
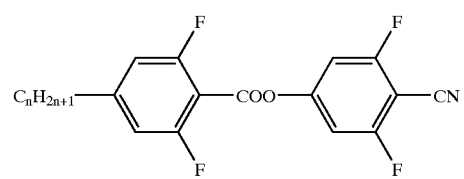
I8
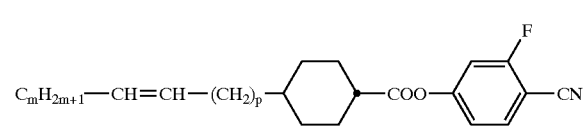
I9
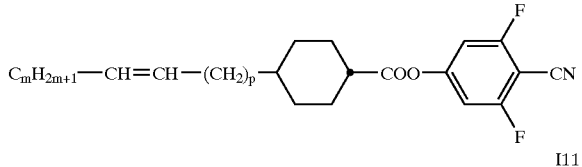
I10
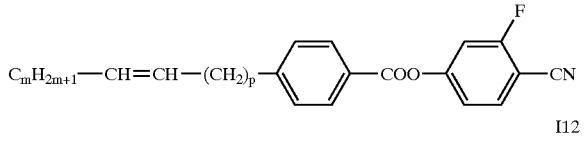
I11
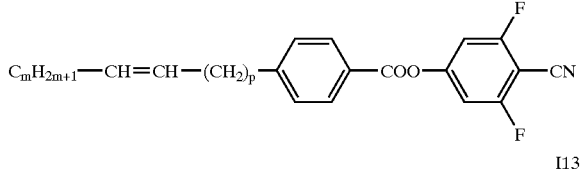
I12
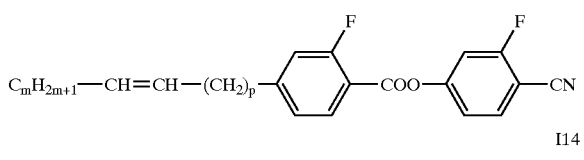
I13
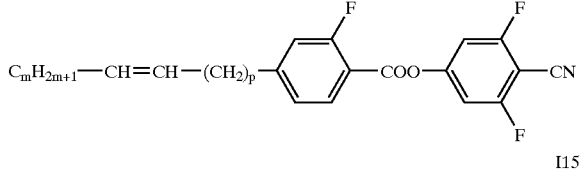
I14
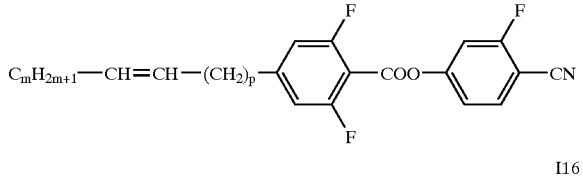
I15
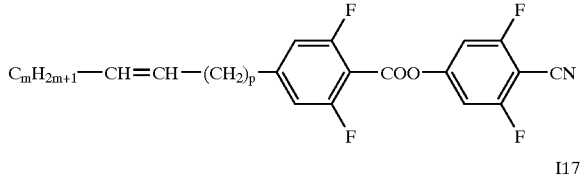
I16
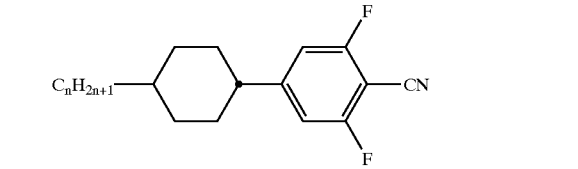
I17
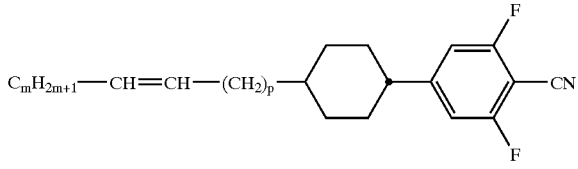
I18 where n is an integer from 1 to 12, m is an integer from 0 to 10, p is an integer from 0 to 10, and m+p is ≦10. Of these compounds, particular preference is given to those which are represented by the formulae IA (=I12) and IB (=I17 and I18):

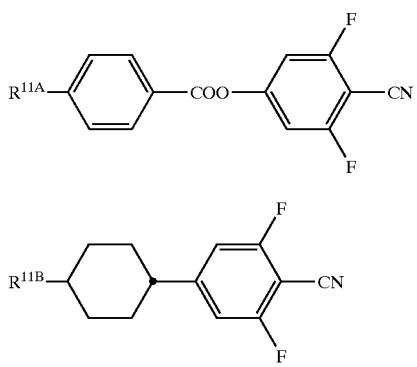

in which $R^{11A}$ is alkenyl having from 2 to 12 carbon atoms; and $R^{11B}$ is alkyl having from 1 to 12 carbon atoms or alkenyl having from 2 to 12 carbon atoms. Particularly advantageous liquid-crystalline mixtures have also proven to be those which, besides the most preferred compounds of the formulae IA and/or IB, comprise further compounds of the formula I, for example of the formula I3.

It is furthermore particularly preferred for n in the compounds I1 to I8 and I17 to be 2, 3, 4 or 5, i.e. $C_nH_{2n+1}$ stands for ethyl, propyl, butyl or pentyl, where in particular n is 2 (i.e. $C_nH_{2n+1}$ stands for ethyl), and for m and p in the compounds I9 to I16 and I18 to be 0 and 0 or 2 respectively.

If the alkenyl-substituted compounds of the formula I can be in the form of E/Z isomers, the E-configured alkenyls of the formula I are preferred.

The proportion of the particularly preferred compounds of the formulae IA and IB in the total amount of the mixtures according to the invention is preferably from 2 to 45% by weight, particularly preferably from 3 to 25% by weight and very particularly preferably from 4 to 20% by weight.

The compounds of the formula II present in the media according to the invention include, for example, compounds of the formulae II1 and II2:

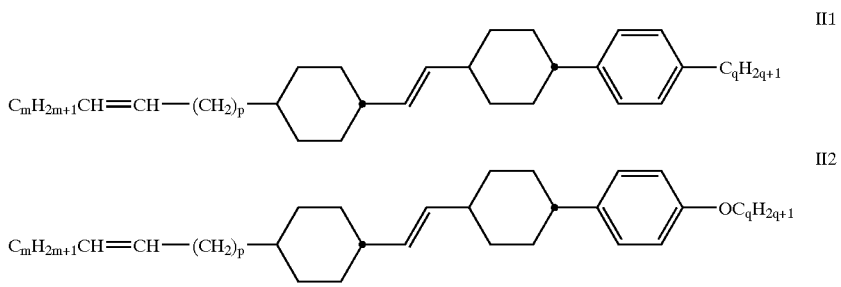

where m and p are each an integer from 0 to 10, m+p is ≦10, and q is an integer from 1 to 12. It is particularly preferred here for m to be 0 or 1, p to be 0 and q to be 1, 2, 3, 4 or 5.

If the terminally alkenyl-substituted compounds of the formulae II1 and II2 can be in the form of E/Z isomers, the E-configured alkenyls are preferred.

Very particularly preferred compounds of the formula II are the compounds of the formulae II1a, II2a and II2b:

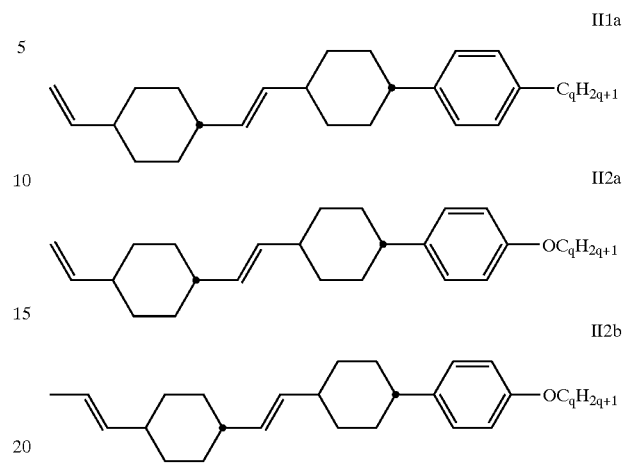

where q is an integer from 1 to 12, in particular from 1 to 5 and very particularly preferably 1 (i.e. $C_qH_{2q+1}$ stands for methyl).

The compounds of the formula II are usually present in the mixtures according to the invention in an amount of 3–30% by weight (based on the total amount), preferably 4–25% by weight and particularly preferably 5–15% by weight.

It is furthermore preferred for component (β) of the liquid-crystalline medium according to the invention to additionally comprise at least one compound of the formula III:

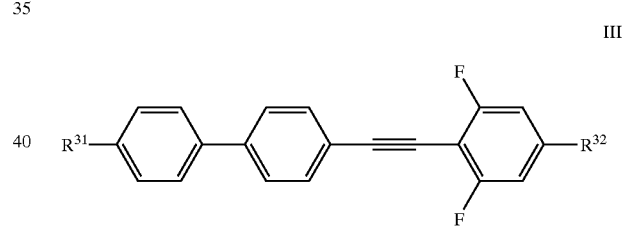

where $R^{31}$ and $R^{32}$, independently of one another, are alkyl having from 1 to 12 carbon atoms or alkenyl having from 2 to 12 carbon atoms, in which one —$CH_2$— group may be replaced by oxygen. $R^{31}$ and $R^{32}$ are in particular unbranched alkyl radicals.

Preferred tolan compounds of the formula III are those of the formulae T1a, T1b, T1c and T1d and of the formula T1e:

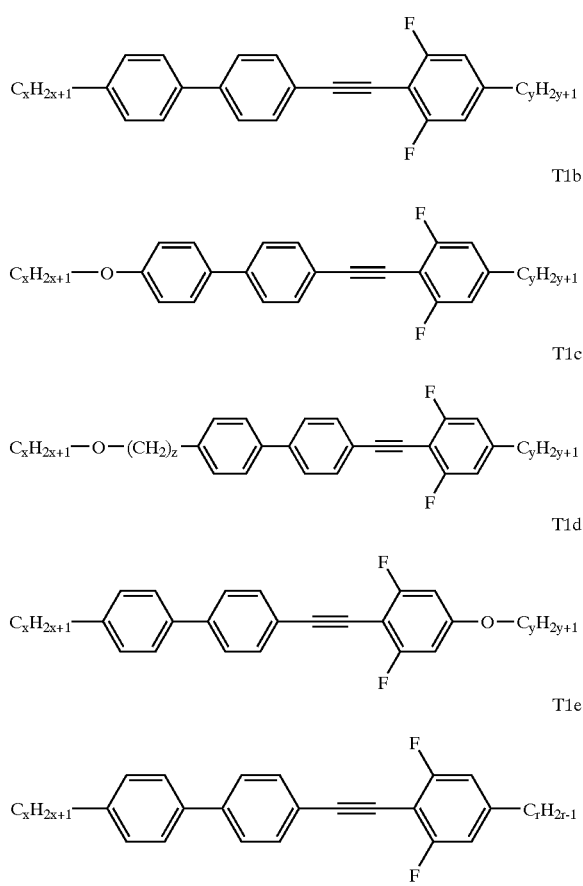

where x in the formulae T1a, T1d and T1e is an integer from 1 to 12, in the formula T1b is an integer from 1 to 11 and in the formula T1c is an integer from 1 to 10, z is an integer from 1 to 10, x+z in the formula T1c is ≦11, y in the formulae T1a–T1c is an integer from 1 to 12 and in the formula T1d is an integer from 1 to 11, and r is an integer from 2 to 12. Particular preference is given to compounds of the formula T1a where x is 1, 2, 3, 4 or 5 and y is 1, 2, 3, 4 or 5; of these compounds, most preference is given to those where x=3 and y=2 or 4.

Compounds of the formula III are usually present in the mixtures according to the invention in an amount of 2–40% by weight, preferably 5–30% by weight and particularly preferably 7.5–25% by weight.

It is furthermore preferred for component (β) of the liquid-crystalline medium according to the invention to additionally comprise at least one compound of the formula IV:

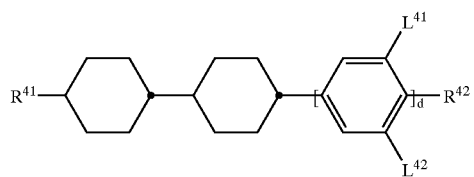

where $L^{41}$ and $L^{42}$, independently of one another, are H or F; $R^{41}$ is alkyl having from 1 to 12 carbon atoms or alkenyl having from 2 to 12 carbon atoms; $R^{42}$ is alkyl having from 1 to 12 carbon atoms, alkenyl having from 2 to 12 carbon atoms or F, where at least one of the radicals $R^{41}$ and $R^{42}$ is alkenyl; and d is 0 or 1.

Of these compounds of the formula IV, particular preference is given to compounds of the formulae IV1 to IV11:

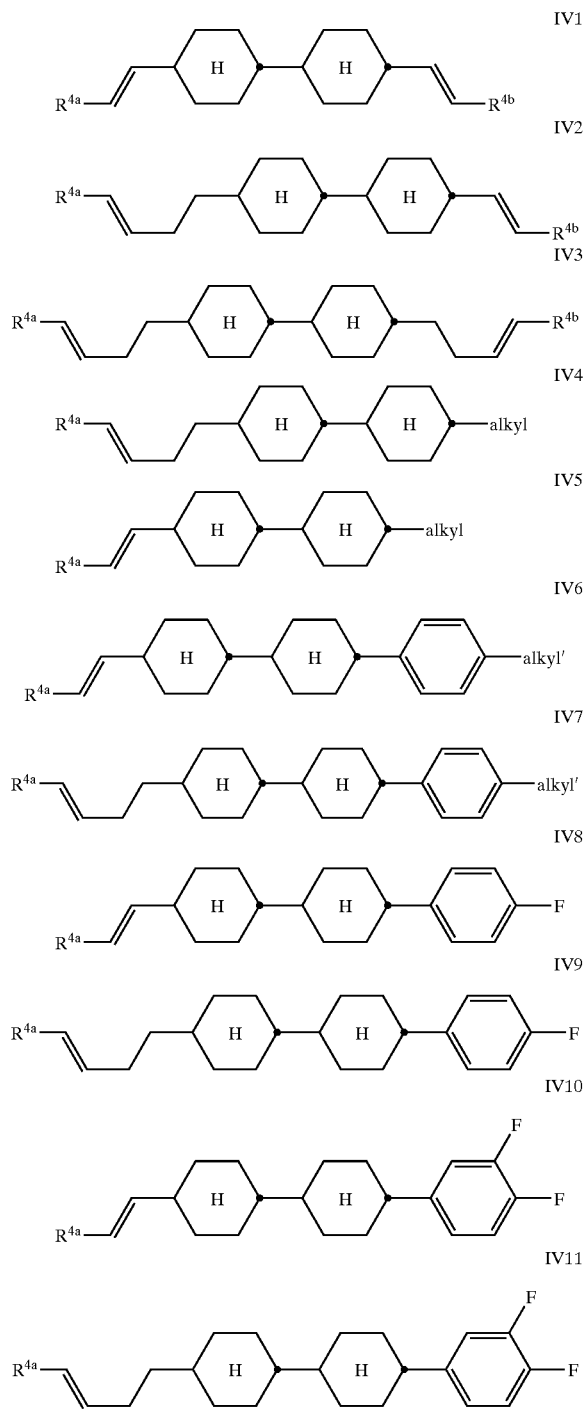

where $R^{4a}$ and $R^{4b}$ are each, independently of one another, H, methyl, ethyl or n-propyl, alkyl is a linear alkyl chain having from 1 to 7 carbon atoms, preferably n-propyl or n-pentyl, and alkyl' is a linear alkyl chain having from 1 to 7 carbon atoms, preferably methyl, n-propyl or n-pentyl.

It is furthermore preferred for component (α) of the energy-saving liquid-crystalline medium according to the invention to additionally comprise at least one compound of the formula V:

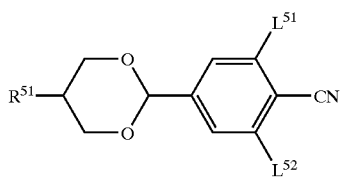

where $L^{51}$ and $L^{52}$, independently of one another, are H or F; and $R^{51}$ is alkyl having from 1 to 12 carbon atoms or alkenyl having from 2 to 12 carbon atoms. $L^{51}$ and $L^{52}$ are preferably simultaneously F, and $R^{51}$ is preferably a linear alkyl chain having from 1 to 7 carbon atoms, in particular methyl, ethyl, n-propyl, n-butyl or n-pentyl.

It is furthermore preferred for component (α) of the energy-saving liquid-crystalline medium according to the invention to additionally comprise at least one compound of the formula VI:

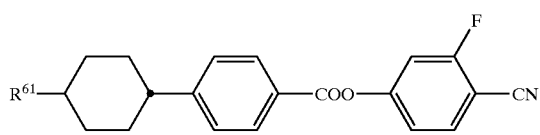

where $R^{61}$ is alkyl having from 1 to 12 carbon atoms. $R^{61}$ is preferably a linear alkyl chain having from 1 to 7 carbon atoms, in particular methyl, ethyl, n-propyl, n-butyl or n-pentyl.

In addition, component (α) may comprise compounds of the formula VII1:

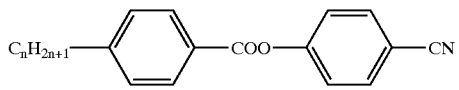

in which n is an integer from 1 to 12.

In general, the compounds of component (α) have a positive dielectric anisotropy Δε of >+1.5 and on use of the media according to the invention in TN and STN displays contribute, in particular, towards reducing the threshold voltage $V_{10}$ and to low values of the rotational viscosity γ1, high steepness of the electro-optical characteristic line and fast response times. At least one of the compounds of component (α) has a Δε of >+1.5, preferably >+3, in particular >+8. The compounds of component (α) are present in the mixtures according to the invention preferably in a total amount of from 5% by weight to 75% by weight, more preferably from 9% by weight to 55% by weight and in particular from 13 to 40% by weight.

Further compounds which may be present in component (β) of the energy-saving media according to the are those of the formulae VIII to XIII:

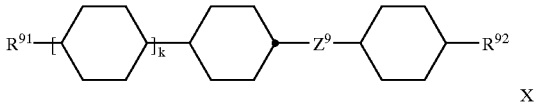

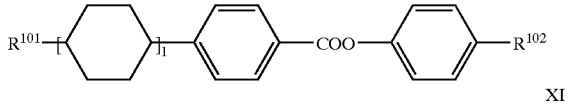

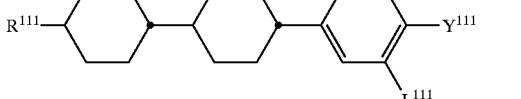

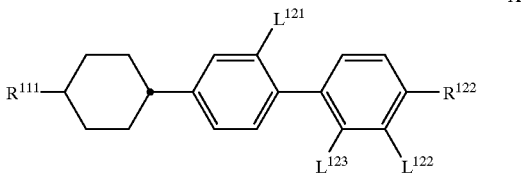

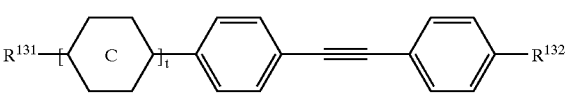

in which $L^{111}$, $L^{121}$, $L^{122}$ and $L^{123}$, and independently of one another, are H or F;

$R^{81}$, $R^{91}$, $R^{92}$, $R^{101}$, $R^{111}$, and $R^{121}$, independently of one another, are alkyl having from 1 to 12 carbon atoms;

$R^{82}$ is F or alkyl having from 1 to 12 carbon atoms, in which one —CH$_2$— group may be replaced by an oxygen atom;

$R^{102}$ is alkyl having from 1 to 12 carbon atoms, in which one —CH$_2$— group may be replaced by an oxygen atom;

$R^{122}$ is F or alkyl having from 1 to 12 carbon atoms;

$R^{131}$ is alkyl having from 1 to 12 carbon atoms or alkenyl having from 2 to 12 carbon atoms;

$R^{132}$ is alkyl having from 1 to 12 carbon atoms or alkenyl having from 2 to 12 carbon atoms, in which one —CH$_2$— group may be replaced by an oxygen atom;

$Y^{111}$ is F, Cl, CF$_3$, OCF$_3$, OCHF$_2$ or —CH=CF$_2$;

$Z^9$ is —COO— or —CH$_2$O—;

k, l and t, independently of one another, are 0 or 1;

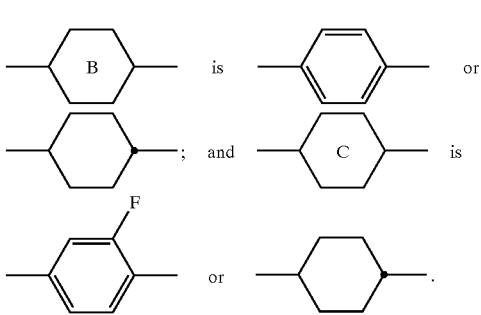

The formula VIII covers, in particular, compounds of the formulae VIII1 to VIII5:

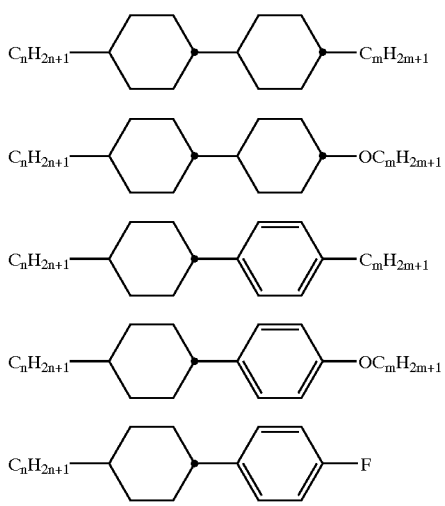

VIII1
VIII2
VIII3
VIII4
VIII5 where n is an integer from 1 to 12, m in the formulae VIII1 and VIII3 is an integer from 1 to 12 and in the formulae VIII2 and VIII4 is an integer from 1 to 11. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl.

The formula IX covers, in particular, compounds of the formulae IX1 to IX3:

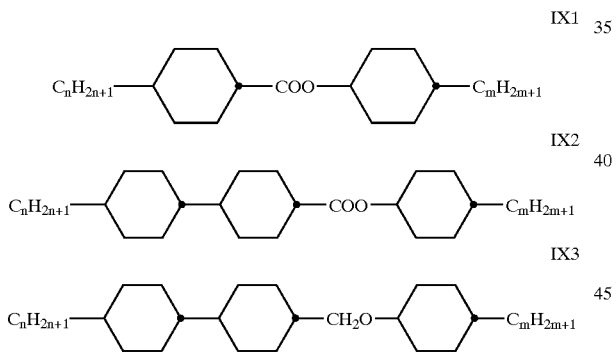

IX1
IX2
IX3 where n and m, independently of one another, are each an integer from 1 to 12. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl.

The formula X covers, in particular, compounds of the formulae X1 to X3:

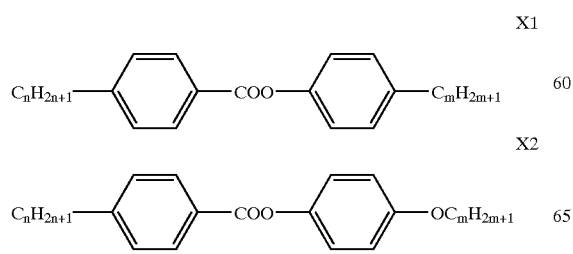

X1
X2
X3

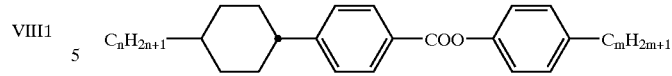

where n is an integer from 1 to 12, m in the formulae X1 and X3 is an integer from 1 to 12 and in the formula X2 is an integer from 1 to 11. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl.

The formula XI covers, in particular, compounds of the formulae XI1 to XI12:

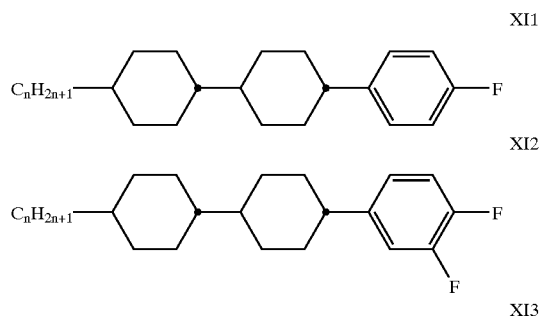

XI1
XI2

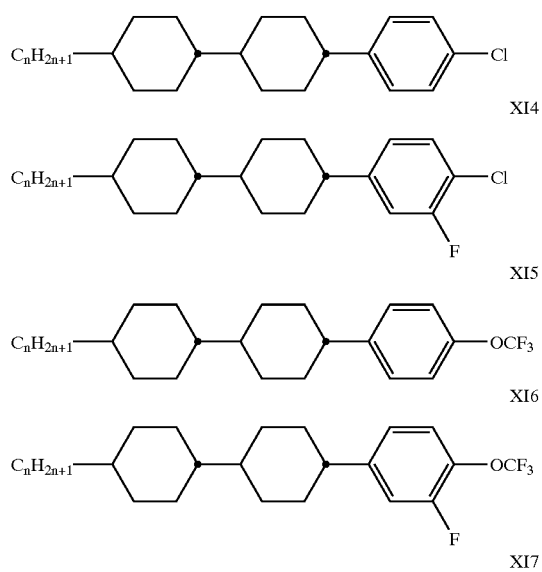

XI3
XI4
XI5
XI6

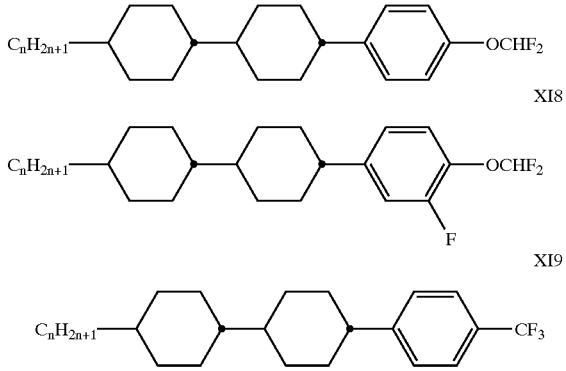

XI7
XI8
XI9

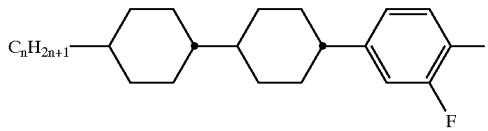

XI10

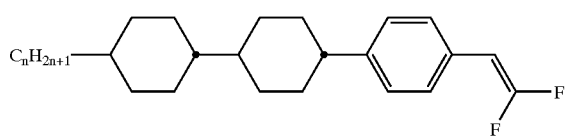

XI11

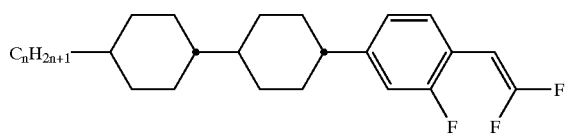

XI12 where n is an integer from 1 to 12. $C_nH_{2n+1}$ is preferably a linear alkyl chain having from 1 to 7 carbon atoms, in particular methyl, ethyl, n-propyl, n-butyl or n-pentyl. Most preference is given here to compounds of the formulae XI2, XI5 and XI6.

The formula XII covers, in particular, compounds of the formulae XII1 to XII7:

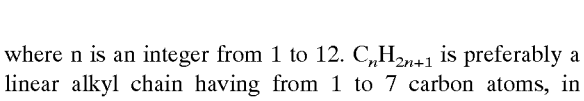

XII1

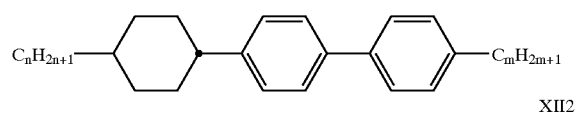

XII2

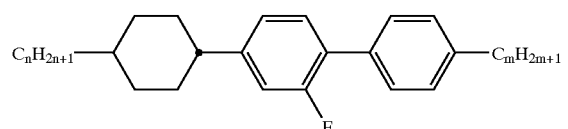

XII3

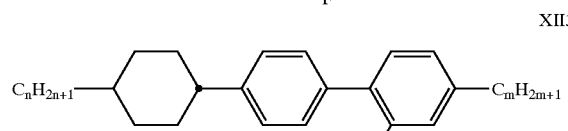

XII4

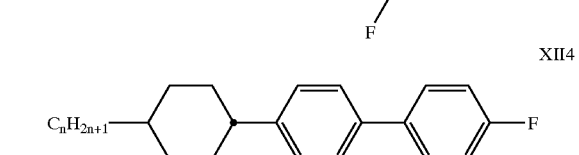

XII5

XII6

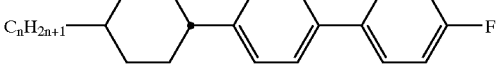

XII7 where n and m are each, independently of one another, an integer from 1 to 12. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl.

The formula XIII covers, in particular, tolan compounds of the formulae XIII1 to XIII8:

XIII1

XIII2

XIII3

XIII4

XIII5

XIII6

XIII7

XIII8 where n is an integer from 1 to 12, m in the formulae XIII1, XIII3 and XIII5 is an integer from 1 to 12 and in the formulae XIII2, XIII4, XIII6 and XIII8 is an integer from 1 to 11, and p is an integer from 2 to 12. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl, while $C_pH_{2p-1}$ is preferably an alkenyl chain having from 2 to 7 carbon atoms, in particular $CH_2=CH-$ and $CH_2=CH-CH_2-CH_2-$.

Furthermore, component (β) of the liquid-crystalline media according to the invention may comprise compounds of the formulae XIV1 to XIV3:

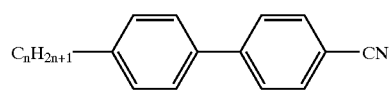

XIV1

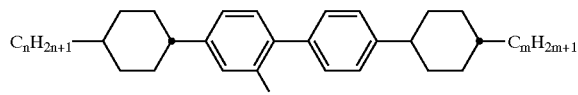

XIV2

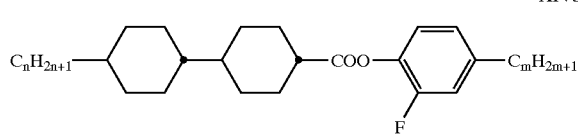

XIV3 where n and m are each, independently of one another, an integer from 1 to 12. $C_nH_{2n+1}$ and $C_mH_{2m+1}$ are preferably each, independently of one another, a linear alkyl chain having from 1 to 7 carbon atoms, in particular methyl, ethyl, n-propyl, n-butyl or n-pentyl.

Compounds of component (β) have predominantly low rotational viscosity values and usually values for the dielectric anisotropy Δε of between +1.5 and −1.5 (without this being absolutely necessary for all compounds of this component). Their proportion in the energy-saving media according to the invention is 25–85% by weight, in particular 35–80% by weight and particularly preferably 40–75% by weight. For the individual selection and amount of the compounds of component (β), it must always be ensured that the dielectric anisotropy $\Delta\epsilon_{corr}$ of the mixture as a whole obeys the above-mentioned equation (1).

The liquid-crystalline media according to the invention optionally also comprise an optically active component (χ) in such an amount that the ratio between the layer thickness (separation of the outer plates) and the natural pitch of the chiral nematic liquid-crystal mixture is greater than 0.2. A multiplicity of chiral dopants, some of which are commercially available, is available to the person skilled in the art for the component, such as, for example, cholesteryl nonanoate (CN), R-811, S-811, R-1011, S-1011, R-2011, S-2011, R-3011, S-3011 and CB15 (Merck KGaA, Darmstadt, Germany) (see also Table C). The dopants may also be employed in combination with one another. The choice of dopants is not crucial per se so long as compliance with the limit defined by equation (1) for the dielectric anisotropy $\Delta\epsilon_{corr}$ of the mixture as a whole is ensured.

The proportion of the compounds of component (χ) is preferably from 0 to 10% by weight, in particular from 0 to 5% by weight, particularly preferably from 0 to 3% by weight (not taking into account the amount data of component (χ) when calculating the total amount of the mixtures according to the invention).

In addition, the liquid-crystalline mixtures according to the invention may also optionally comprise up to 20% by weight, in particular from 0 to 15% by weight, of component (δ); this component (δ) comprises compounds which can optionally be utilized for fine adjustment of mixture properties for specific applications. Thus, some of these compounds can increase the steepness of the electro-optical characteristic line or reduce the temperature dependence of essential mixture parameters. It should be noted here that they may influence the properties of the liquid-crystalline media according to the invention in such a way that the dielectric anisotropy $\Delta\epsilon_{corr}$ of the mixture as a whole increases significantly. The amount of the compounds of component (δ) employed is therefore restricted to a maximum of 20% by weight.

The compounds of component (δ) are, inter alia, compounds of the formulae XV to XIX:

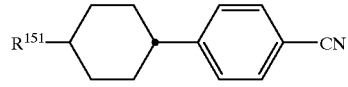

XV

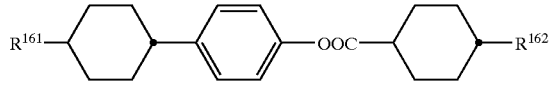

XVI

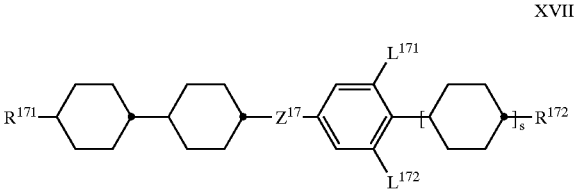

XVII

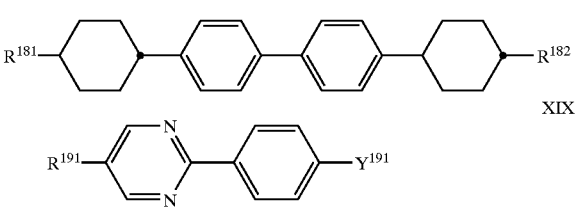

XVIII

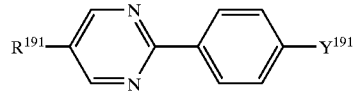

XIX where $L^{171}$ and $L^{172}$, independently of one another, are H or F;

$R^{151}$ is alkyl having from 1 to 12 carbon atoms or alkenyl having from 2 to 12 carbon atoms;

$R^{161}$, $R^{162}$, $R^{171}$, $R^{181}$, $R^{182}$ and $R^{191}$, independently of one another, are alkyl having from 1 to 12 carbon atoms;

$R^{172}$ is alkyl having from 1 to 12 carbon atoms or F;

$Y^{191}$ is F or Cl;

$Z^{17}$ is —COO— or —(CH$_2$)$_2$—; and s is 0 or 1.

The liquid-crystal displays according to the invention preferably comprise no compounds of component (δ).

Further preferred embodiments of the present invention relate to energy-saving liquid-crystalline media according to the invention which, besides the compounds of components (α) and (β) and optionally (δ) and (χ), comprise liquid-crystalline compounds of the formulae XX1 to XX40:

XX1

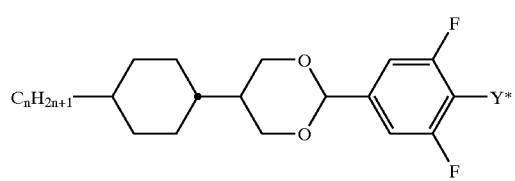

-continued

-continued

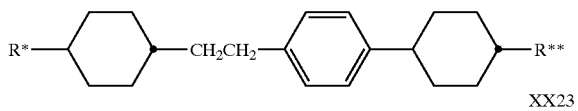
XX23

XX24

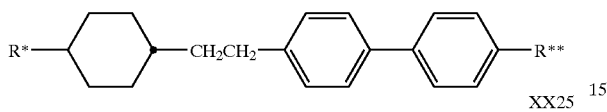
XX25

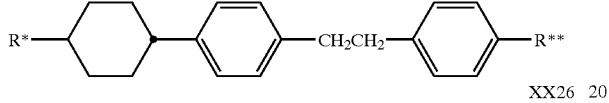
XX26

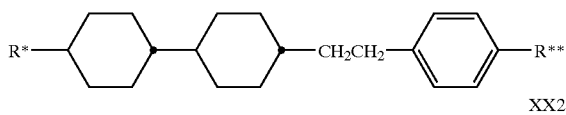
XX27

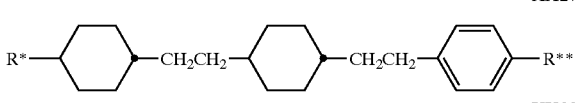
XX28

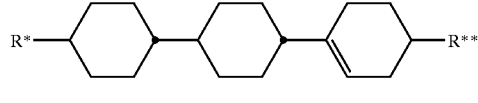
XX29

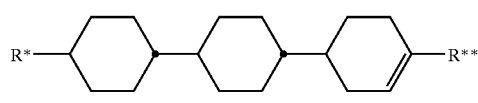
XX30

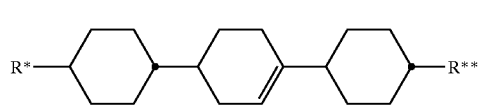
XX31

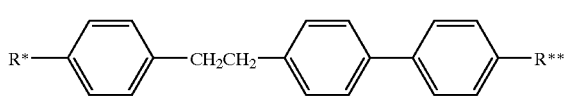
XX32

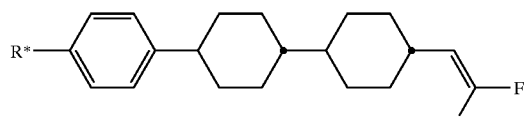
XX33

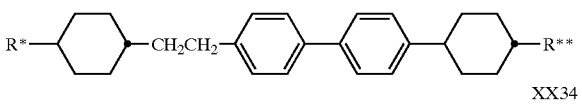
XX34

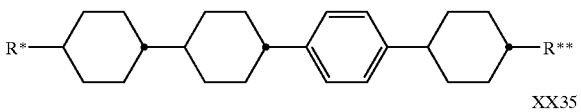
XX35

-continued

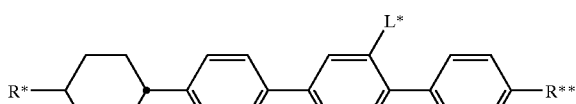
XX36

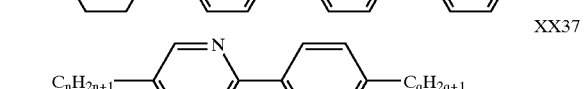
XX37

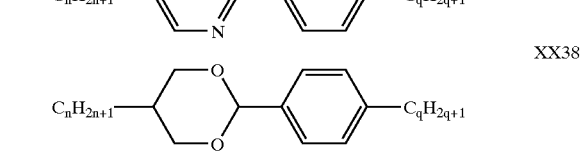
XX38

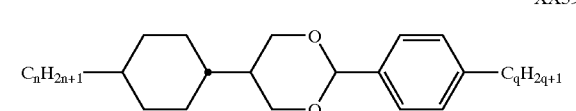
XX39

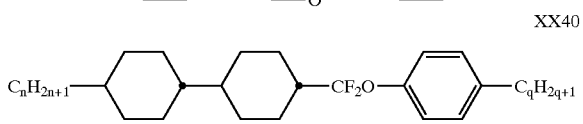
XX40 where n and q are each, independently of one another, an integer between 1 and 12;

m and p are each an integer from 0 to 10, and m+p is $\leq 10$;

L* and L**, independently of one another, are H or F;

R* and R**, independently of one another, are an alkyl or alkenyl radical having up to 15 carbon atoms which is unsubstituted, monosubstituted by CN or $CF_3$ or at least least monosubstituted by halogen, where one or more $CH_2$ groups in these radicals may also be replaced by —O—, —S—, —C≡C—, —CO—O— or —O—CO— in such a way that O atoms are not linked directly to one another; and Y* is F, Cl, or a halogenated alkyl, alkenyl or alkoxy radical having from 1 to 6 carbon atoms.

The proportion of these compounds in the mixtures according to the invention in each case depends on the condition indicated in equation (1) for the dielectric anisotropy $\Delta\epsilon_{corr}$ of the liquid-crystalline medium being observed. Their proportion is usually not more than 20% by weight.

For the purposes of the present invention, the term "alkyl" means a saturated unbranched or branched (aliphatic) hydrocarbon radical, preferably having 1, 2, 3, 4, 5, 6, 7, 8, 9, 10, 11 or 12 carbon atoms. The hydrocarbon radical is preferably unbranched and has from 1 to 7 carbon atoms. Particularly preferred examples are methyl, ethyl, n-propyl, n-butyl, n-pentyl, n-hexyl and n-heptyl.

For the purposes of the present invention, the term "alkenyl" means an unbranched or branched acyclic (aliphatic) hydrocarbon radical having at least one C=C double bond and preferably 2, 3, 4, 5, 6, 7, 8, 9, 10, 11 or 12 carbon atoms. The hydrocarbon radical is preferably unbranched and has from 1 to 7 carbon atoms. If the alkenyl radical can have the E and Z configuration, i.e. carries at least one substituent on both carbon atoms of the C=C double bond, it preferably has the E configuration. Particularly preferred examples of alkenyl are vinyl and 1E- and 3E-alkenyl having up to 7 carbon atoms, in particular vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl.

If one —CH$_2$— group in the alkyl and alkenyl radicals is replaced by oxygen (O), this replacement can in principle take place at any point of the alkyl or alkenyl chain. Preference is given here to O-alkyl, O-alkenyl and —CH$_2$—CH$_2$—O-alkyl radicals.

As has been shown, setting of the dielectric anisotropy $\Delta\epsilon_{corr}$ of the liquid-crystalline mixtures according to the invention in accordance with equation (1)

$$\Delta\varepsilon_{corr} \leq \frac{5 \cdot V_{10} + 32}{V_{10}^2} \quad (1)$$

achieves the desired energy-saving effect. Preference is given to mixtures for which:

$$\Delta\varepsilon_{corr} \leq \frac{5 \cdot V_{10} + 30.5}{V_{10}^2}; \quad (1')$$

particular preference is given to mixtures for which:

$$\Delta\varepsilon_{corr} \leq \frac{5 \cdot V_{10} + 29}{V_{10}^2}. \quad (1'')$$

The liquid-crystal mixtures used in the TN and STN cells according to the invention are—while complying with the limit indicated in equation (1)—dielectrically positive with $\Delta\epsilon \geq 1$; particular preference is given here to liquid-crystal mixtures where $\Delta\epsilon \geq 3$, in particular where $\Delta\epsilon \geq 5$.

The energy-saving liquid-crystalline media according to the invention are distinguished, in particular on use in TN and STN displays with high layer thicknesses, by very low total response times ($t_{tot}=t_{on}+t_{off}$).

The liquid-crystal mixtures according to the invention have favorable values for the threshold voltage $V_{10}$ and for the rotational viscosity $\gamma 1$. If the value for the optical path difference d·$\Delta$n is pre-specified, the value for the layer thickness d is determined by the optical anisotropy $\Delta$n. In particular at relatively high values for $\Delta$n, the use of liquid-crystal mixtures according to the invention is generally preferred since the value for d can then be selected to be relatively small, which results in particularly favorable values for the response times. However, liquid-crystal displays according to the invention which comprise liquid-crystal mixtures according to the invention having smaller values for $\Delta$n are also characterized by advantageous values for the response times.

The liquid-crystal mixtures according to the invention are furthermore characterized by advantageous values for the steepness of the electro-optical characteristic line and can be operated with high multiplex rates, in particular at temperatures above 20° C. In addition, the liquid-crystal mixtures according to the invention have high stability and favorable values for the electrical resistance and the frequency dependence of the threshold voltage. The liquid-crystal displays according to the invention have a large working-temperature range and good angle dependence of the contrast.

The construction of the liquid-crystal display elements according to the invention from polarizers, electrode base plates and electrodes with a surface treatment such that the preferential orientation (director) of the respective adjacent liquid-crystal molecules is usually rotated by a value of from 160° to 720° with respect to one another from one electrode to the other corresponds to the usual construction for display elements of this type. The term usual construction is broadly drawn here and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pretilt angles between the longitudinal axis of the molecules at the surface of the outer plates and the outer plates of from 0° to 7°, preferably from 0.01° to 5°, in particular from 0.1 to 2°. The pretilt angle STN displays is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after mixing.

The dielectrics may also comprise further additives known to the person skilled in the art and described in the literature. For example, 0–15% by weight of pleochroic dyes may be added.

The compounds employed in the liquid-crystalline media according to the invention are known per se from the literature and can—if they are not commercially available—be prepared by processes known from the prior art.

The entire disclosure of all applications, patents and publications, cited herein and of corresponding German application No. 10246358.1, filed Oct. 4, 2002, is incorporated by reference herein.

The present invention is explained in greater detail and illustrated, but not restricted, by the following examples. In these examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ in these formulae are straight-chain alkyl radicals having n and m carbon atoms respectively. The alkenyl radicals in these examples have the trans-configuration. The coding in Table B is self-evident. In Table A, only the acronym for the parent structure is indicated. In individual cases, the acronym for the parent structure is followed, separated by a dash, by the code shown in the following table for the substituents $R^1$, $R^2$, $L^1$, $L^2$ and $L^3$. Letters set in parentheses denote an optionally present radical or an optionally present atom; thus, for example, PCH-n(O)m covers both PCH-nm and PCH-nOm.

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$ | $C_nH_{2n+1}$ | OCF3 | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

TABLE A ($L^1$, $L^2$, $L^3$ = H or F)

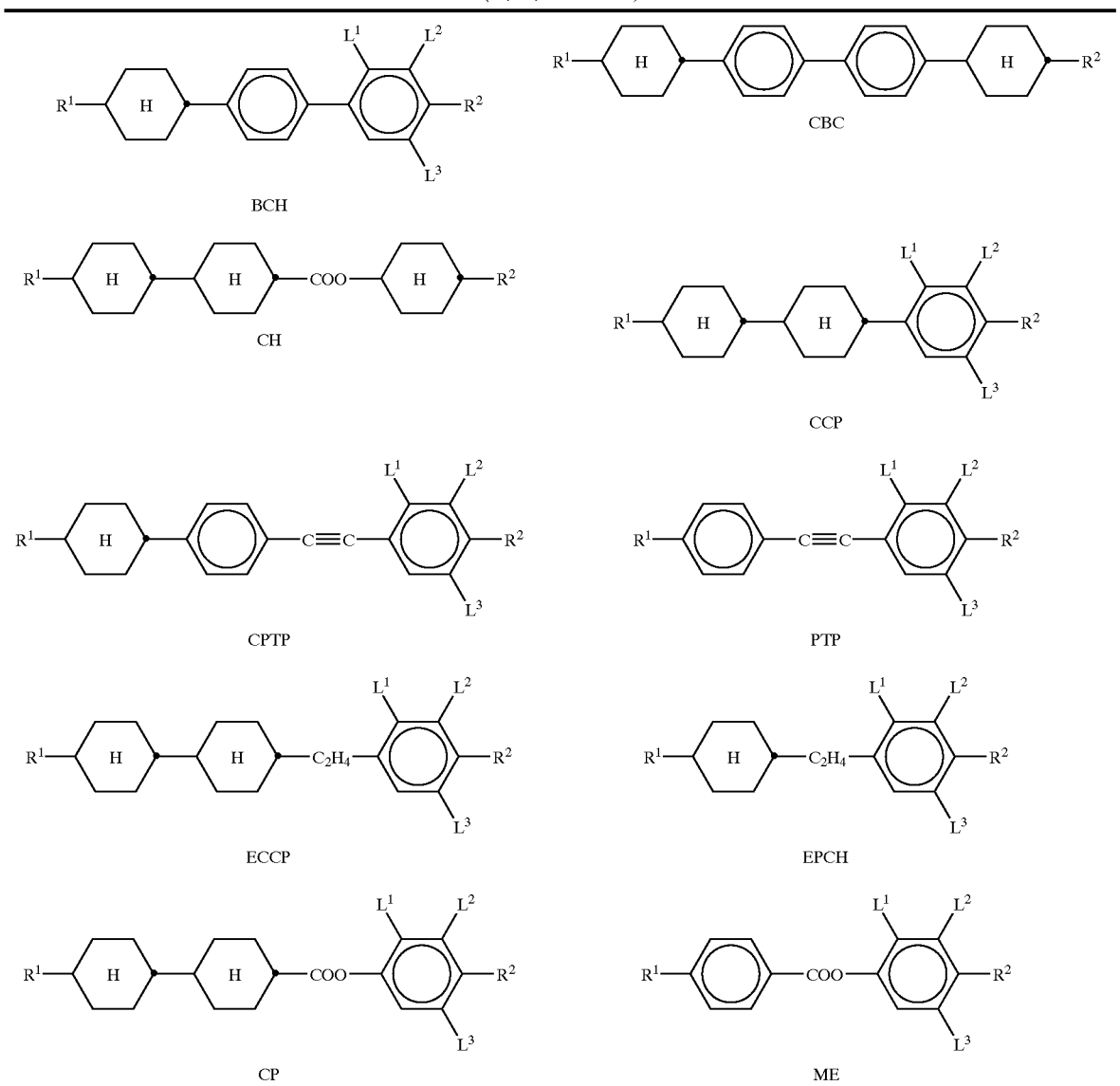

TABLE A-continued
($L^1, L^2, L^3$ = H or F)
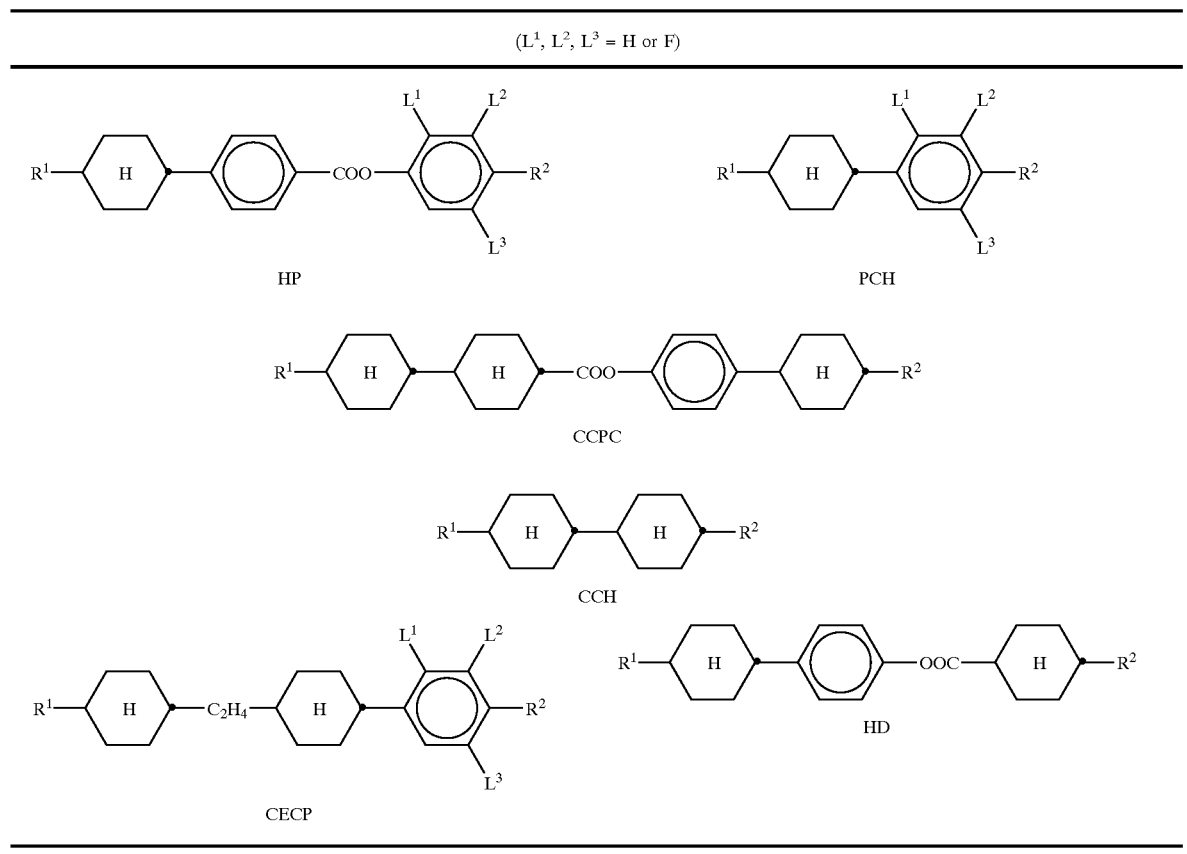
TABLE B
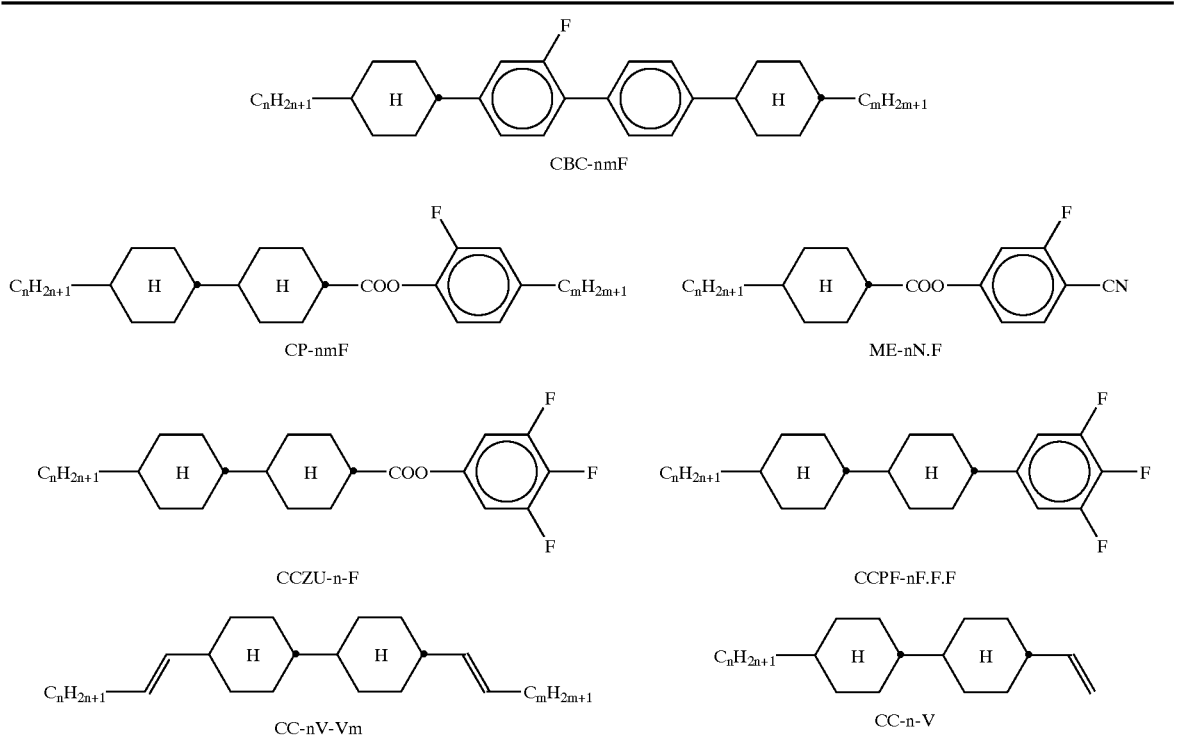

TABLE B-continued
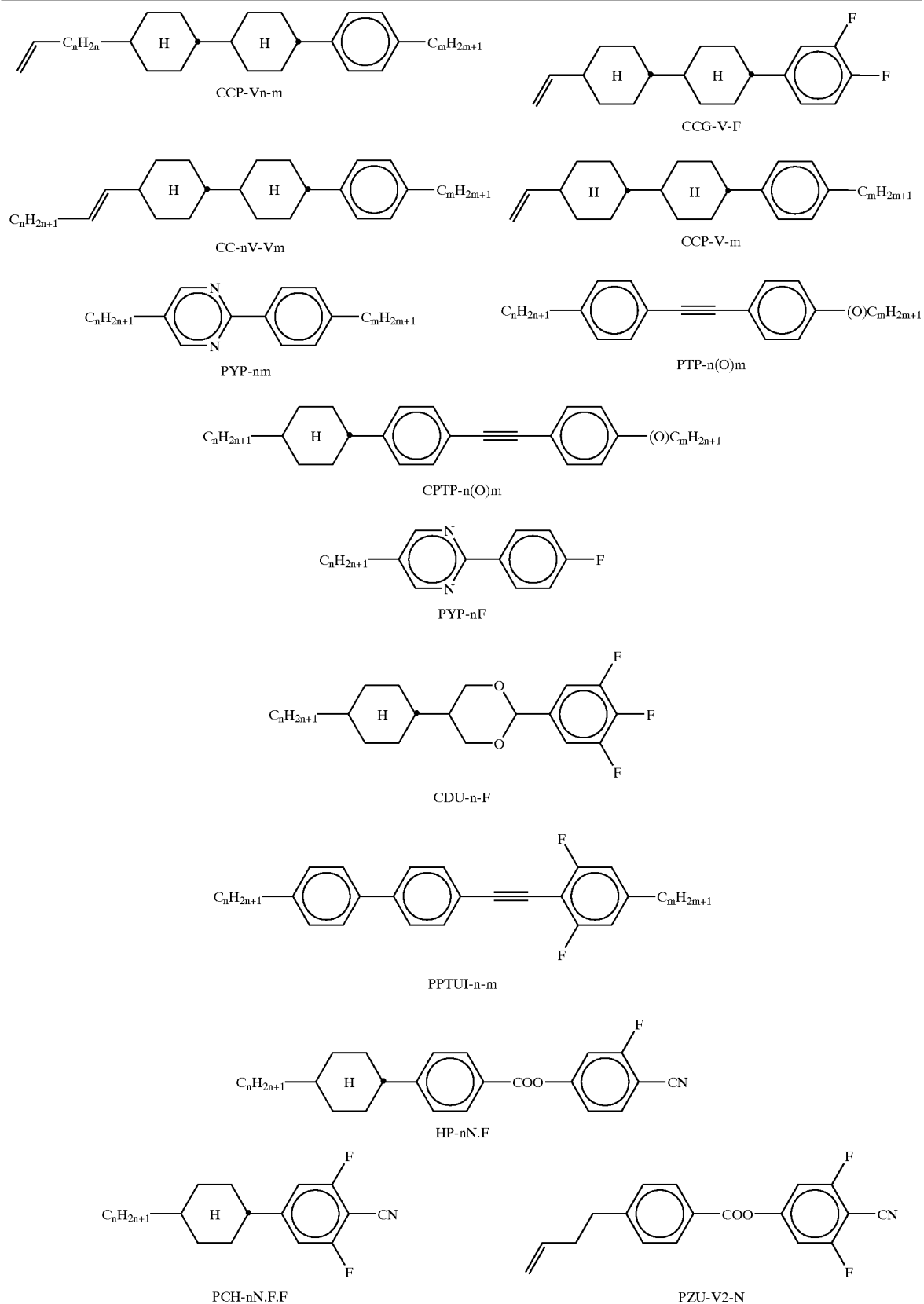

TABLE B-continued
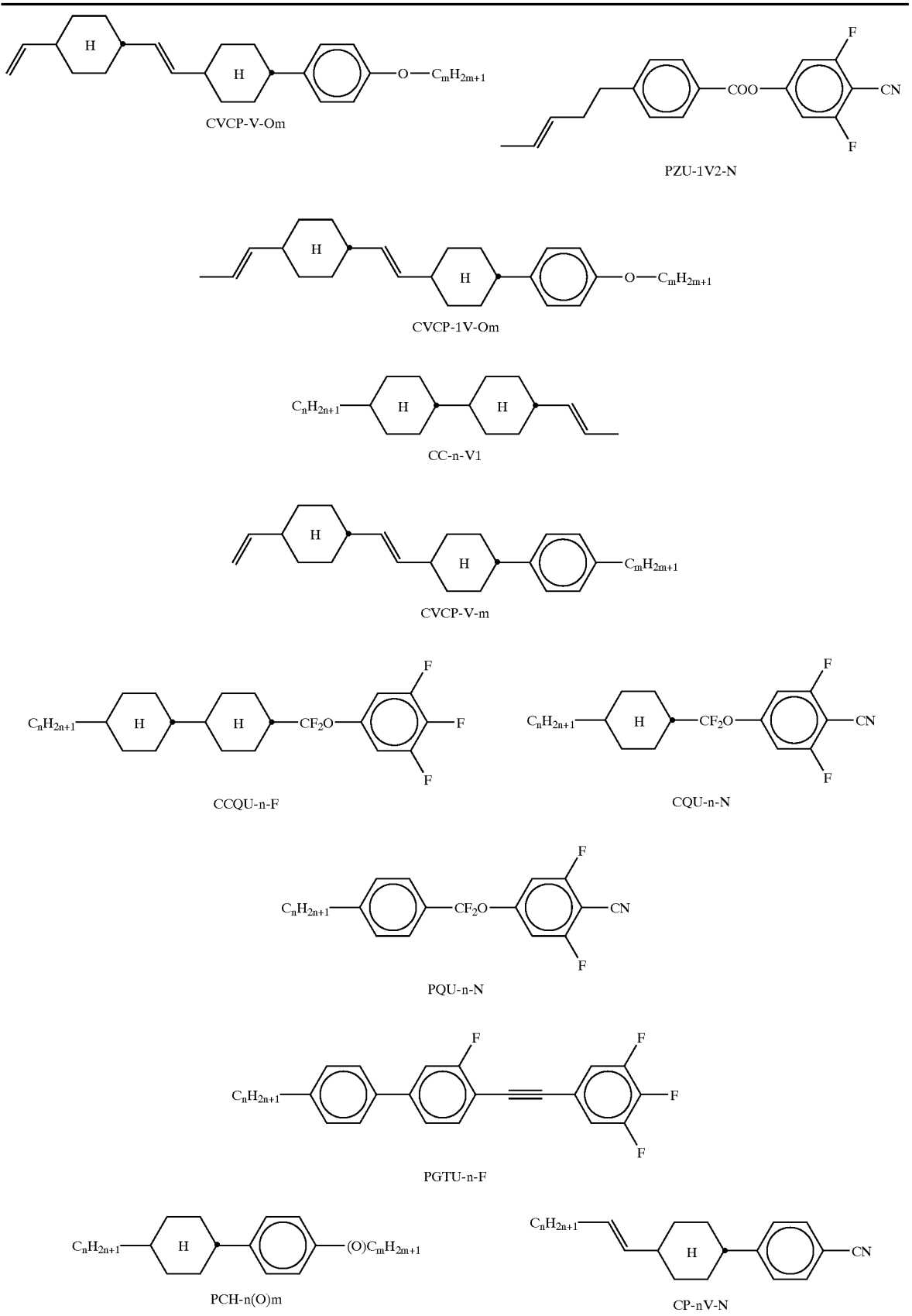

TABLE C
Table C shows possible dopants which can be added to the mixtures according to the invention (component (χ)).
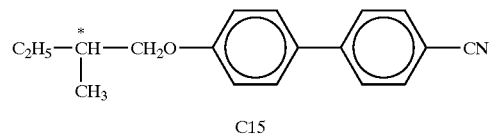
C15
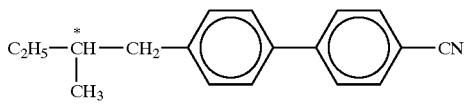
CB15
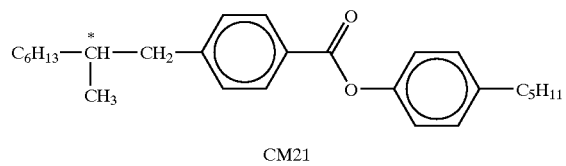
CM21
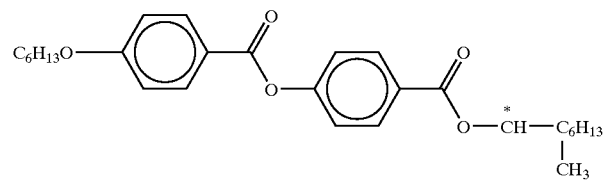
R/S-811
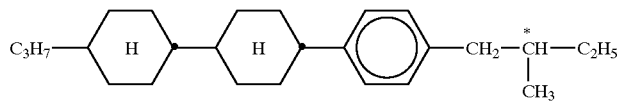
CM44
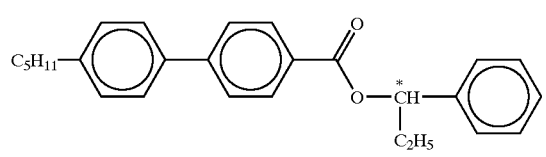
CM45
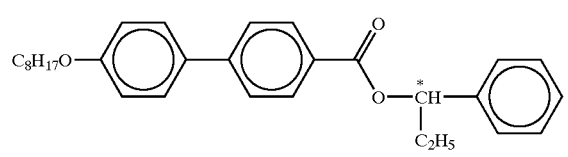
CM47
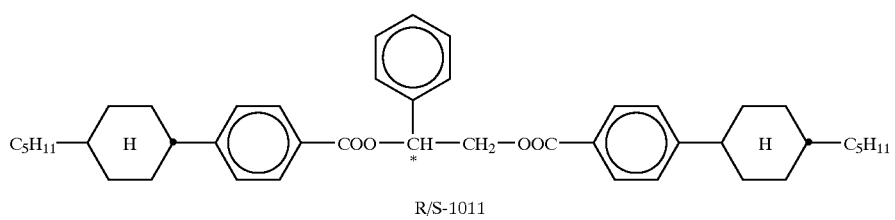
R/S-1011
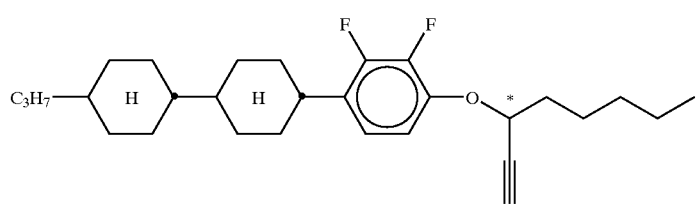
R/S-3011
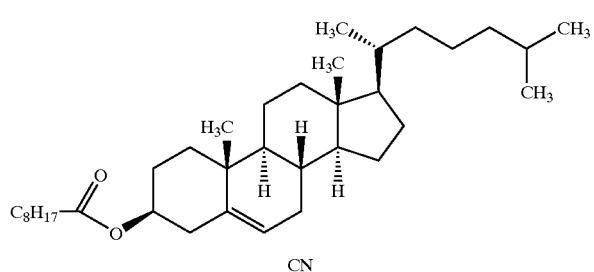
CN

TABLE C-continued

Table C shows possible dopants which can be added to the mixtures according to the invention (component ($\chi$)).

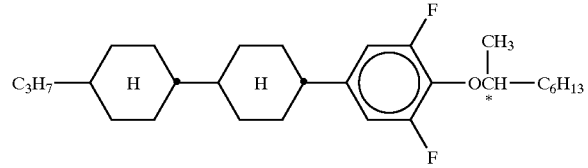

R/S-2011

Table C:

Table C shows possibl dopante which can be added to the mixtures according to the invention (component(X)).

EXAMPLES

The abbreviations used in the examples have the following meanings:

| | |
|---|---|
| cl.p. | clearing point (nematic-isotropic phase transition temperature), |
| S-N | smectic-nematic phase transition temperature, |
| visc. | flow viscosity (mm$^2$/s, at 20° C. unless stated otherwise), |
| $\gamma 1$ | rotational viscosity (mPa · s, at 20° C.unless stated otherwise), |
| $\Delta n$ | optical anisotropy (589 nm, 20° C.), |
| $\Delta \epsilon_{exp}$ | dielectric anisotropy (1 kHz, 20° C.), |
| $\Delta \varepsilon_{corr} = \Delta \varepsilon_{exp} \cdot \dfrac{\left(1 - \dfrac{T_{exp}}{373K}\right)^{0.22}}{\left(1 - \dfrac{T_{exp}}{T_{cl.p.}}\right)^{0.22}}$ | ($T_{exp}$ and $T_{cl.p.}$ each in ° K), |
| HTP | helical twisting power (determined at 20° C. using S-811, unless stated otherwise), |
| steep | characteristic line steepness = ($V_{90}/V_{10}$ − 1) · 100 [%], |
| $V_{10}$ | threshold voltage = characteristic voltage at a relative contrast of 10%, |
| $V_{90}$ | characteristic voltage at a relative contrast of 90%, |
| $t_{ave}$ | $\dfrac{t_{on} + t_{off}}{2}$ (average response time), |
| $t_{on}$ | time from switching on until 90% of the maximum contrast has been reached, |
| $t_{off}$ | time from switching off until 10% of the maximum contrast has been reached, |
| Mux | multiplex rate, |
| $t_{store}$ | low-temperature storage stability in hours (−20° C., −30° C., −40° C.) |

All temperatures above and below—unless stated otherwise—are indicated in °C. The percentages are per cent by weight. All values relate to 20° C., unless stated otherwise. The displays are addressed, unless stated otherwise, with no multiplexing. The twist is 240°, unless stated otherwise.

Example 1

| | | | |
|---|---|---|---|
| PCH-3N.F.F | 5.0% | Clearing point [° C.]: | 100.5 |
| ME2N.F | 2.0% | $\Delta n$ [589 nm; 20° C.]: | 0.1337 |
| ME3N.F | 2.0% | $\Delta \epsilon_{exp}$ [20° C.] | 9.2 |
| PZU-V2-N | 5.0% | $\Delta \epsilon_{corr}$ [20° C.] | 9.1 |
| PCH-3O2 | 11.5% | $\gamma 1$ [mPa · s] | 177 |
| PTP-2O1 | 5.0% | HTP [1/$\mu$m, 20° C.]: | −11.9 |
| PTP-1O2 | 3.5% | Twist [°]: | 240 |
| CCG-V-F | 18.0% | $V_{10}$ [V]: | 2.12 |
| CCP-V-1 | 5.0% | Steep | 6.4 |
| CVCP-V-1 | 5.0% | | |
| CVCP-V-O1 | 5.0% | | |
| CVCP-1V-O1 | 3.0% | | |
| BCH-3F.F | 7.0% | | |
| BCH-5F.F | 7.0% | | |
| HD-34 | 7.0% | | |
| HP-53 | 9.0% | | |

Example 2

| | | | |
|---|---|---|---|
| PCH-3N.F.F | 5.0% | Clearing point [° C.]: | 100.5 |
| ME2N.F | 2.0% | $\Delta n$ [589 nm; 20° C.]: | 0.1330 |
| ME3N.F | 2.0% | $\Delta \epsilon_{exp}$ [20° C.] | 9.3 |
| PZU-V2-N | 5.0% | $\Delta \epsilon_{corr}$ [20° C.] | 9.3 |
| PCH-3O2 | 9.5% | | |
| PTP-2O1 | 5.0% | HTP [1/$\mu$m, 20° C.]: | −11.5 |
| PTP-1O2 | 3.5% | Twist [°]: | 240 |
| CCG-V-F | 17.0% | $V_{10}$ [V]: | 2.09 |
| CCP-V-1 | 10.0% | Steep | 7.1 |
| CCP-V2-1 | 6.0% | | |
| CVCP-V-1 | 5.0% | | |
| BCH-3F.F | 7.0% | | |
| BCH-5F.F | 7.0% | | |
| HD-34 | 7.0% | | |
| HP-53 | 9.0% | | |

Example 3

| | | | |
|---|---|---|---|
| PCH-3N.F.F | 4.0% | Clearing point [° C.]: | 99.4 |
| ME2N.F | 2.0% | $\Delta n$ [589 nm; 20° C.]: | 0.1314 |
| ME3N.F | 3.0% | $\Delta \epsilon_{exp}$ [20° C.] | 9.4 |
| ME4N.F | 10.0% | $\Delta \epsilon_{corr}$ [20° C.] | 9.4 |
| CC-3-V1 | 8.0% | $\gamma 1$ [mPa · s] | 126 |
| CC-5-V | 18.0% | HTP [1/$\mu$m, 20° C.]: | −10.5 |
| PCH-3O1 | 2.0% | Twist [°]: | 240 |
| CCG-V-F | 12.0% | $V_{10}$ [V]: | 2.11 |
| CCP-V-1 | 12.0% | Steep | 7.1 |
| CCP-V2-1 | 7.0% | | |
| CVCP-1V-O1 | 5.0% | | |
| CVCP-V-O1 | 5.0% | | |
| PPTUI-3-2 | 12.0% | | |

Example 4[GU1]

| | | | |
|---|---|---|---|
| PCH-3N.F.F | 8.0% | Clearing point [° C.]: | 91.5 |
| ME2N.F | 2.0% | Δn [589 nm; 20° C.]: | 0.1391 |
| ME3N.F | 3.0% | $\Delta\epsilon_{exp}$ [20° C.] | 17.0 |
| ME4N.F | 4.0% | $\Delta\epsilon_{corr}$ [20° C.] | 17.4 |
| PZU-V2-N | 11.0% | | |
| CC-3-V1 | 8.0% | HTP [1/μm, 20° C.]: | −11.8 |
| CC-5-V | 8.5% | Twist [°]: | 240 |
| CCG-V-F | 18.0% | $V_{10}$ [V]: | 1.44 |
| CCP-V-1 | 10.0% | Steep | 6.1 |
| CVCP-V-1 | 5.0% | | |
| CVCP-1V-O1 | 5.0% | | |
| CVCP-V-O1 | 5.0% | | |
| PPTUI-3-2 | 12.5% | | |

Example 5[GU2]

| | | | |
|---|---|---|---|
| PCH-3N.F.F | 15.0% | Clearing point [° C.]: | 98.5 |
| ME2N.F | 3.0% | Δn [589 nm; 20° C.]: | 0.1782 |
| ME3N.F | 3.0% | $\Delta\epsilon_{exp}$ [20° C.] | 17.4 |
| ME4N.F | 8.0% | $\Delta\epsilon_{corr}$ [20° C.] | 17.5 |
| ME5N.F | 4.0% | | |
| CCG-V-F | 20.0% | HTP [1/μm, 20° C.]: | −12.6 |
| CCP-V-1 | 7.0% | Twist [°]: | 240 |
| CVCP-V-1 | 5.0% | $V_{10}$ [V]: | 1.39 |
| CVCP-1V-O1 | 5.0% | Steep | 6.7 |
| CVCP-V-O1 | 5.0% | | |
| PPTUI-3-2 | 20.0% | | |
| PPUI-3-4 | 5.0% | | |

Example 6[GU3]

| | | | |
|---|---|---|---|
| PCH-3N.F.F | 13.0% | Clearing point [° C.]: | 99 |
| ME2N.F | 3.0% | Δn [589 nm; 20° C.]: | 0.1206 |
| ME3N.F | 3.0% | $\Delta\epsilon_{exp}$ [20° C.] | 19.3 |
| ME4N.F | 10.0% | $\Delta\epsilon_{corr}$ [20° C.] | 19.4 |
| ME5N.F | 9.0% | | |
| CCG-V-F | 20.0% | HTP [1/μm, 20° C.]: | −13.1 |
| CCP-V-1 | 14.0% | Twist [°]: | 240 |
| CCP-V2-1 | 8.0% | $V_{10}$ [V]: | 1.40 |
| CVCP-V-1 | 5.0% | Steep | 3.9 |
| CVCP-1V-O1 | 5.0% | | |
| CVCP-V-O1 | 5.0% | | |
| CCPC-33 | 3.0% | | |
| CCPC-34 | 2.0% | | |

Example 7[GU4]

| | | | |
|---|---|---|---|
| PCH-3N.F.F | 11.0% | Clearing point [° C.]: | 98.5 |
| ME2N.F | 2.0% | Δn [589 nm; 20° C.]: | 0.1603 |
| ME3N.F | 3.0% | $\Delta\epsilon_{exp}$ [20° C.] | 19.2 |
| ME4N.F | 7.0% | $\Delta\epsilon_{corr}$ [20° C.] | 19.2 |
| ME5N.F | 8.0% | | |
| CCG-V-F | 19.0% | HTP [1/μm, 20° C.]: | −12.8 |
| CCP-V-1 | 14.0% | Twist [°]: | 240 |
| CP-1V-N | 8.0% | $V_{10}$ [V]: | 1.42 |
| CVCP-1V-O1 | 5.0% | Steep | 5.1 |
| CVCP-V-O1 | 5.0% | | |
| CCPC-33 | 3.0% | | |
| PPTUI-3-2 | 15.0% | | |

Example 8[GU5]

| | | | |
|---|---|---|---|
| PCH-3N.F.F | 9.0% | Clearing point [° C.]: | 98 |
| PCH-5N.F.F | 5.0% | Δn [589 nm; 20° C.]: | 0.1802 |
| ME2N.F | 2.0% | $\Delta\epsilon_{exp}$ [20° C.] | 18.9 |
| ME3N.F | 3.0% | $\Delta\epsilon_{corr}$ [20° C.] | 19.0 |
| ME4N.F | 5.0% | | |
| ME5N.F | 6.0% | HTP [1/μm, 20° C.]: | −12.9 |
| CCG-V-F | 22.5% | Twist [°]: | 240 |
| CBC-33F | 5.0% | $V_{10}$ [V]: | 1.43 |
| CP-1V-N | 9.0% | Steep | 5.4 |
| CVCP-1V-O1 | 5.0% | | |
| CVCP-V-O1 | 5.0% | | |
| PPTUI-3-2 | 23.5% | | |

Example 9[GU6]

| | | | |
|---|---|---|---|
| PCH-3N.F.F | 10.0% | Clearing point [° C.]: | 93.5 |
| ME2N.F | 5.0% | Δn [589 nm; 20° C.]: | 0.1400 |
| ME3N.F | 5.0% | $\Delta\epsilon_{exp}$ [20° C.] | 20.5 |
| ME4N.F | 7.0% | $\Delta\epsilon_{corr}$ [20° C.] | 20.7 |
| ME5N.F | 7.0% | γ1 [mPa · s] | 209 |
| HP-3N.F | 6.0% | HTP [1/μm, 20° C.]: | −12.4 |
| CC-5-V | 8.5% | Twist [°]: | 240 |
| CCG-V-F | 15.0% | $V_{10}$ [V]: | 1.32 |
| CCP-V-1 | 9.0% | Steep | 6.2 |
| CCP-V2-1 | 5.0% | | |
| CVCP-V-1 | 5.0% | | |
| CVCP-1V-O1 | 5.0% | | |
| CVCP-V-O1 | 5.0% | | |
| PPTUI-3-2 | 7.5% | | |

Comparative Example [GU7]

| | | | |
|---|---|---|---|
| PCH-3N.F.F | 10.0% | Clearing point [° C.]: | 102 |
| ME2N.F | 5.0% | Δn [589 nm; 20° C.]: | 0.1299 |
| ME3N.F | 5.0% | $\Delta\epsilon_{exp}$ [20° C.] | 21.2 |
| ME4N.F | 7.5% | $\Delta\epsilon_{corr}$ [20° C.] | 21.1 |
| ME5N.F | 8.0% | HTP [1/μm, 20° C.]: | −12.5 |
| CCG-V-F | 16.0% | Twist [°]: | 240 |
| CP-1V-N | 5.0% | $V_{10}$ [V]: | 1.42 |
| CC-3-V1 | 8.0% | Steep | 4.6 |
| CCPC-33 | 4.0% | | |
| CCPC-34 | 4.0% | | |
| CCPC-35 | 4.0% | | |
| CCP-V-1 | 10.0% | | |
| CVCP-1V-O1 | 5.0% | | |
| CVCP-V-O1 | 5.0% | | |
| PPTUI-3-2 | 3.5% | | |

This mixture has a value for $\Delta\epsilon_{corr}$ (21.1) which is above the value of 19.4 calculated in accordance with equation (1) and proves to be a mixture with high energy consumption.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising
a component (α) which comprises at least one compound of the formula I

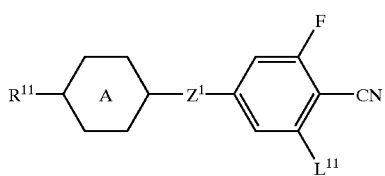

where
$L^{11}$ is H or F;
$R^{11}$ is alkyl having from 1 to 12 carbon atoms or alkenyl having from 2 to 12 carbon atoms;
$Z^1$ is a single bond or —COO—; and

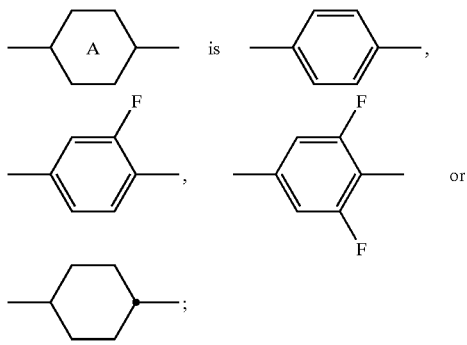

and
a component (β) which comprises at least one compound of the formula II

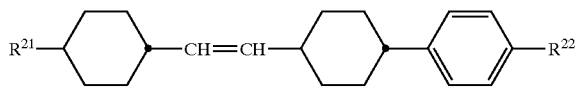

where
$R^{21}$ is alkyl having from 1 to 12 carbon atoms or alkenyl having from 2 to 12 carbon atoms;
$R^{22}$ is alkyl having from 1 to 12 carbon atoms or alkenyl having from 2 to 12 carbon atoms, in which one —CH$_2$— group is optionally replaced by oxygen;
where the following applies for the dielectric anisotropy $\Delta\epsilon_{corr}$ of the liquid-crystalline medium:

$$\Delta\varepsilon_{corr} \leq \frac{5 \cdot V_{10} + 32}{V_{10}^2}, \quad (1)$$

and at least one compound of formula III:

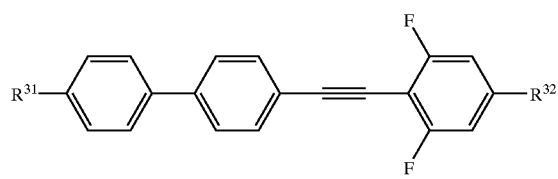

where
$R^{31}$ and $R^{32}$, independently of one another, are alkyl having from 1 to 12 carbon atoms or alkenyl having from 2 to 12 carbon atoms, in which one —CH$_2$— group is optionally replaced by oxygen.

2. A liquid-crystalline medium comprising
a component (α) which comprises at least one compound of formula I

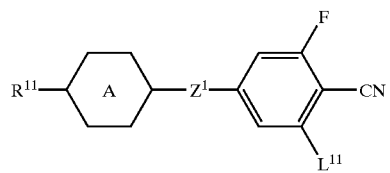

where $L^{11}$ is H or F;
$R^{11}$ is alkyl having from 1 to 12 carbon atoms or alkenyl having from 2 to 12 carbon atoms;
$Z^1$ is a single bond or —COO—; and

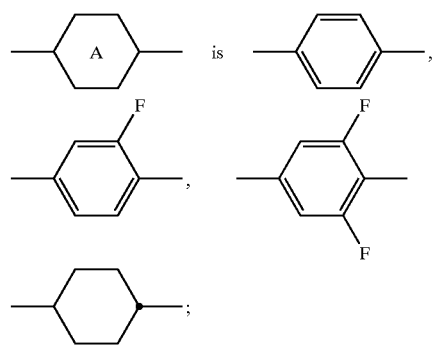

and a component (β) which comprises at least one compound of formula II

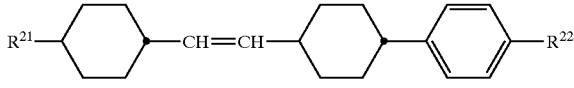

where $R^{21}$ is alkyl having from 1 to 12 carbon atoms or alkenyl having from 2 to 12 carbon atoms;
$R^{22}$ is alkyl having from 1 to 12 carbon atoms or alkenyl having from 2 to 12 carbon atoms, in which one —CH$_2$— group is optionally replaced by oxygen;
where the following applies for the dielectric anisotropy $\Delta\epsilon_{corr}$ of the liquid-crystalline medium:

$$\Delta\varepsilon_{corr} \leq \frac{5 \cdot V_{10} + 32}{V_{10}^2}, \quad (1)$$

and at least one compound of formula IV:

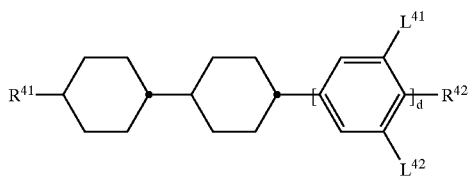
IV where

L$^{41}$ and L$^{42}$, independently of one another, are H or F;

R$^{41}$ is alkyl having from 1 to 12 carbon atoms or alkenyl having from 2 to 12 carbon atoms;

R$^{42}$ is alkyl having from 1 to 12 carbon atoms, alkenyl having from 2 to 12 carbon atoms or F;

with the proviso that at least one of the radicals R$^{41}$ and R$^{42}$ is alkenyl; and d is 0 or 1.

3. A liquid-crystalline medium according to claim 1, wherein component (β) further comprises at least one compound of the formula IV:

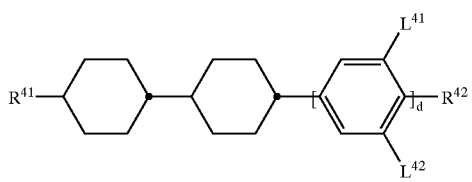
IV where

L$^{41}$ and L$^{42}$, independently of one another, are H or F;

R$^{41}$ is alkyl having from 1 to 12 carbon atoms or alkenyl having from 2 to 12 carbon atoms;

R$^{42}$ is alkyl having from 1 to 12 carbon atoms, alkenyl having from 2 to 12 carbon atoms or F;

with the proviso that at least one of the radicals R$^{41}$ and R$^{42}$ is alkenyl; and d is 0 or 1.

4. A liquid-crystalline medium comprising a component (α) which comprises at least one compound of the formula I

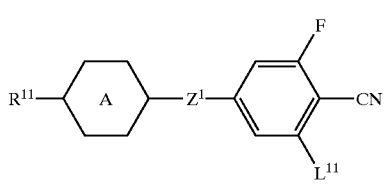
I where

L$^{11}$ is H or F;

R$^{11}$ is alkyl having from 1 to 12 carbon atoms or alkenyl having from 2 to 12 carbon atoms;

Z$^{1}$ is a single bond or —COO—; and

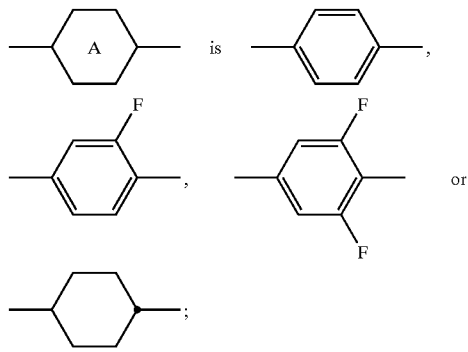

and at least one compound of formula V:

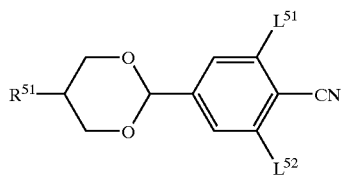
V where

L$^{51}$ and L$^{52}$, independently of one another, are H or F; and

R$^{51}$ is alkyl having from 1 or 2 carbon atoms or alkenyl having from 2 to 12 carbon atoms; and a component (β) which comprises at least one compound of the formula II

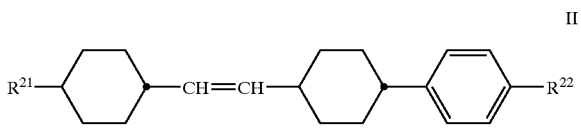
II where

R$^{21}$ is alkyl having from 1 to 12 carbon atoms or alkenyl having from 2 to 12 carbon atoms;

R$^{22}$ is alkyl having from 1 to 12 carbon atoms or alkenyl having from 2 to 12 carbon atoms, in which one —CH$_2$— group is optionally replaced by oxygen;

where the following applies for the dielectric anisotropy Δε$_{corr}$ of the liquid-crystalline and medium:

$$\Delta\varepsilon_{corr} \leq \frac{5 \cdot V_{10} + 32}{V_{10}^2}. \qquad (1)$$

5. A liquid-crystalline medium according to claim 1, wherein component (α) further comprises at least one compound of formula V:

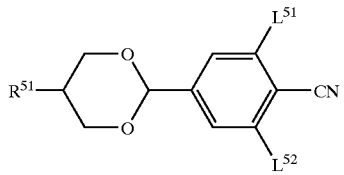

where

L$^{51}$ and L$^{52}$, independently of one another, are H or F; and

R$^{51}$ is alkyl having from 1 to 12 carbon atoms or alkenyl having from 2 to 12 carbon atoms.

6. A liquid-crystalline medium according to claim 2, wherein component (α) further comprises at least one compound of the formula V:

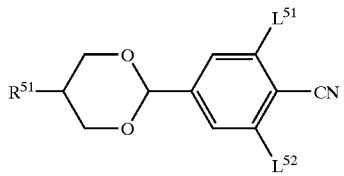

where

L$^{51}$ and L$^{52}$, independently of one another, are H or F; and

R$^{51}$ is alkyl having from 1 to 12 carbon atoms or alkenyl having from 2 to 12 carbon atoms.

7. A liquid-crystalline medium comprising a component (α) which comprises at least one compound of the formula I

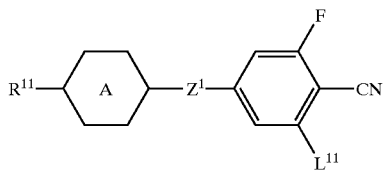

where

L$^{11}$ is H or F;

R$^{11}$ is alkyl having from 1 to 12 carbon atoms or alkenyl having from 2 to 12 carbon atoms;

Z$^1$ is a single bond —COO—; and

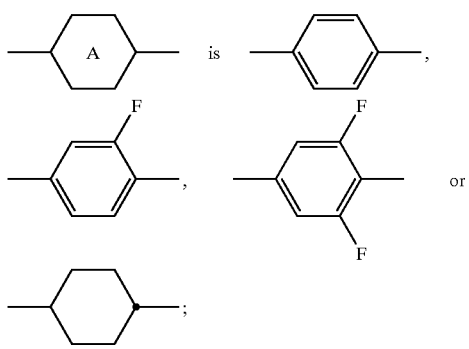

and a compound of the formula VI:

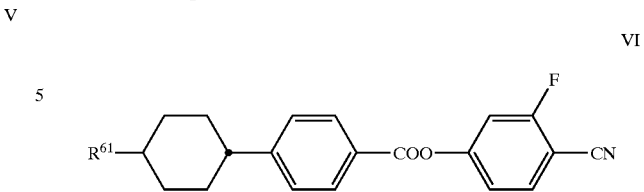

where

R$^{61}$ is alkyl having from 1 to 12 carbon atoms; and a component (β) which comprises at least one compound of the formula II

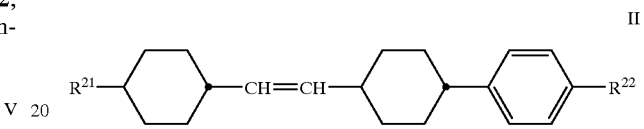

where

R$^{21}$ is alkyl having from 1 to 12 carbon atoms or alkenyl having from 2 to 12 carbon atoms;

R$^{22}$ is alkyl having from 1 to 12 carbon atoms or alkenyl having from 2 to 12 carbon atoms, in which one —CH$_2$— group is optionally replaced by oxygen;

where the following applies for the dielectric anisotropy Δε$_{corr}$ of the liquid-crystalline medium:

$$\Delta\varepsilon_{corr} \leq \frac{5 \cdot V_{10} + 32}{V_{10}^2}. \qquad (1)$$

8. A liquid-crystalline medium according to claim 1, wherein component (α) further comprises a compound of the formula VI:

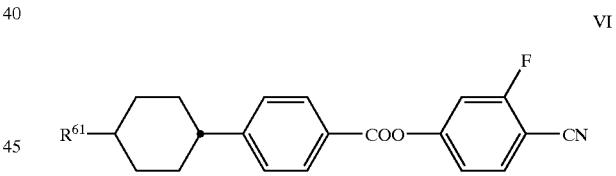

where

R$^{61}$ is alkyl having from 1 to 12 carbon atoms.

9. A liquid-crystalline medium according to claim 2, wherein component (α) further comprises a compound of the formula VI:

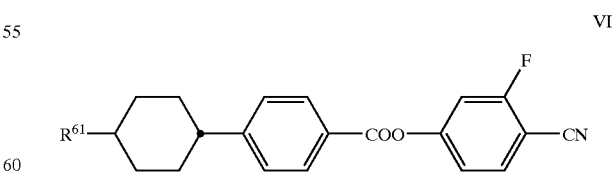

where

R$^{61}$ is alkyl having from 1 to 12 carbon atoms.

10. A liquid-crystalline medium according to claim 4, wherein component (α) further comprises a compound of the formula VI:

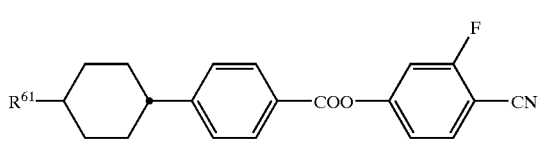

where

R$^{61}$ is alkyl having from 1 to 12 carbon atoms.

11. A liquid-crystalline medium comprising a component (α) which comprises at least one compound of formula I

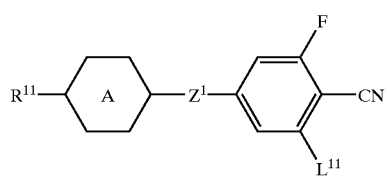

where

L$^{11}$ is H or F;

R$^{11}$ is alkyl having from 1 to 12 carbon atoms or alkenyl having 2 to 12 carbon atoms;

Z$^1$ is a single bond or —COO—; and

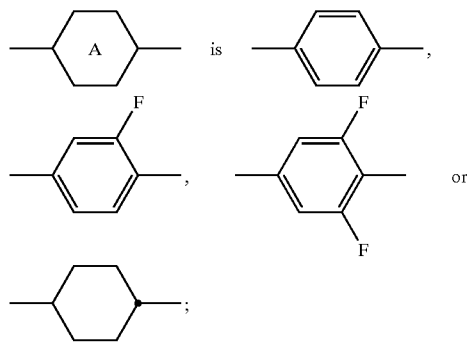

and a component (β) which comprises at least one compound of the formula II

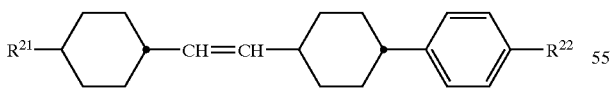

where

R$^{21}$ is alkyl having from 1 to 12 carbon atoms or alkenyl having from 2 to 12 carbon atoms;

R$^{22}$ is alkyl having from 1 to 12 carbon atoms or alkenyl having from 2 to 12 carbon atoms, in which one —CH$_2$— group is optionally replaced by oxygen;

where the following applies for the dielectric anisotropy $\Delta\epsilon_{corr}$ of the liquid-crystalline medium:

$$\Delta\epsilon_{corr} \leq \frac{5 \cdot V_{10} + 32}{V_{10}^2}, \quad (1)$$

wherein component (α) is present in an amount of 5 to 75% by weight based on the total weight of the medium.

12. A liquid-crystalline medium according to claim 11, wherein component (α) is present in an amount of 9 to 55% by weight.

13. A liquid-crystalline medium according to claim 11, wherein component (α) is present in an amount of from 13 to 40% by weight.

14. A liquid-crystalline medium comprising a component (α) which comprises at least one compound of the formula IA and/or of the formula IB:

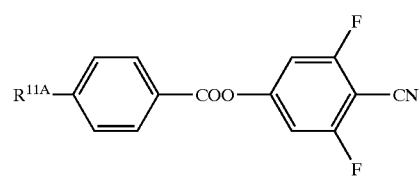

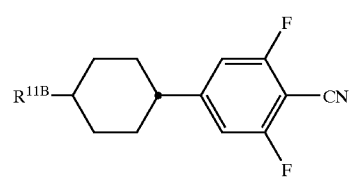

in which

R$^{11A}$ is alkenyl having from 2 to 12 carbon atoms; and

R$^{11B}$ is alkyl having from 1 to 12 carbon atoms or alkenyl having from 2 to 12 carbon atoms; and a component (β) which comprises at least one compound of the formula II

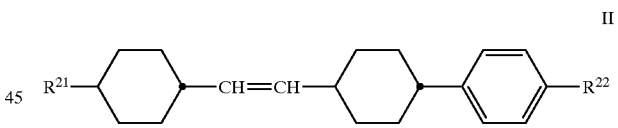

where

R$^{21}$ is alkyl having from 1 to 12 carbon atoms or alkenyl having from 2 to 12 carbon atoms; R$^{22}$ is alkyl having from 1 to 12 carbon atoms or alkenyl having from 2 to 12 carbon atoms, in which one —CH$_2$— group is optionally replaced by oxygen;

where the following applies for the dielectric anisotropy $\Delta\epsilon_{corr}$ of the liquid-crystalline medium:

$$\Delta\epsilon_{corr} \leq \frac{5 \cdot V_{10} + 32}{V_{10}^2}. \quad (1)$$

15. An electro-optical display device which contains a liquid-crystalline medium according to claim 2.

16. The display device of claim 15 which is a TN or STN display device.

17. A method for operating an electro-optical TN or STN display device in an energy-saving manner wherein the device contains a liquid-crystalline medium of claim 1.

18. An electro-optical display device which contains a liquid-crystalline medium according to claim 1.

19. An electro-optical display device which contains a liquid-crystalline medium according to claim 4.

20. An electro-optical display device which contains a liquid-crystalline medium according to claim 7.

21. An electro-optical display device which contains a liquid-crystalline medium according to claim 11.

22. An electro-optical display device which contains a liquid-crystalline medium according to claim 14.

* * * * *

UNITED STATES PATENT AND TRADEMARK OFFICE
CERTIFICATE OF CORRECTION

PATENT NO.      : 6,902,776 B2
APPLICATION NO. : 10/677323
DATED           : June 7, 2005
INVENTOR(S)     : Michael Junge It is certified that error appears in the above-identified patent and that said Letters Patent is hereby corrected as shown below:

Column 39, line 51: reads:

" $\Delta\varepsilon_{corr} \leq \dfrac{5 \cdot V_{10} + 32}{V_{10}^2}$ "

should read:

-- $\Delta\varepsilon_{corr} \leq \dfrac{5 \cdot V_{10} + 32}{V_{10}^2}$ --.

Column 40, line 64: reads:

" $\Delta\varepsilon_{corr} \leq \dfrac{5 \cdot V_{10} + 32}{V_{10}^2}$ "

should read:

-- $\Delta\varepsilon_{corr} \leq \dfrac{5 \cdot V_{10} + 32}{V_{10}^2}$ --.

Column 42, line 35: reads "1 or 2 carbon" should read -- 1 to 12 carbon --.

Column 42, line 50: reads "and medium" should read -- medium --.

Column 42, line 61: reads:

" $\Delta\varepsilon_{corr} \leq \dfrac{5 \cdot V_{10} + 32}{V_{10}^2}$ "

should read:

-- $\Delta\varepsilon_{corr} \leq \dfrac{5 \cdot V_{10} + 32}{V_{10}^2}$ --.

UNITED STATES PATENT AND TRADEMARK OFFICE
CERTIFICATE OF CORRECTION

PATENT NO.       : 6,902,776 B2
APPLICATION NO.  : 10/677323
DATED            : June 7, 2005
INVENTOR(S)      : Michael Junge It is certified that error appears in the above-identified patent and that said Letters Patent is hereby corrected as shown below:

Column 44, line 33: reads:

" $\Delta\varepsilon_{corr} \leq \dfrac{5 \cdot V_{10} + 32}{V_{10}^2}$ "

should read:

-- $\Delta\varepsilon_{corr} \leq \dfrac{5 \cdot V_{10} + 32}{V_{10}^2}$ --.

Column 46, line 1: reads:

" $\Delta\varepsilon_{corr} \leq \dfrac{5 \cdot V_{10} + 32}{V_{10}^2}$ "

should read:

-- $\Delta\varepsilon_{corr} \leq \dfrac{5 \cdot V_{10} + 32}{V_{10}^2}$ --.

UNITED STATES PATENT AND TRADEMARK OFFICE
CERTIFICATE OF CORRECTION

PATENT NO. : 6,902,776 B2
APPLICATION NO. : 10/677323
DATED : June 7, 2005
INVENTOR(S) : Michael Junge It is certified that error appears in the above-identified patent and that said Letters Patent is hereby corrected as shown below:

Column 46, line 57: reads:

$$`` \Delta \varepsilon_{corr} \leq \frac{5 \cdot V_{10} + 32}{V_{10}^2} \text{ ''}$$

should read:

$$-- \Delta \varepsilon_{corr} \leq \frac{5 \cdot V_{10} + 32}{V_{10}^2} --.$$

Signed and Sealed this

Twenty-ninth Day of July, 2008

JON W. DUDAS
*Director of the United States Patent and Trademark Office*